United States Patent
Iwamura

(10) Patent No.: US 6,947,409 B2
(45) Date of Patent: Sep. 20, 2005

(54) BANDWIDTH MANAGEMENT OF VIRTUAL NETWORKS ON A SHARED NETWORK

(75) Inventor: Ryuichi Iwamura, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 10/651,519

(22) Filed: Aug. 29, 2003

(65) Prior Publication Data

US 2004/0184406 A1 Sep. 23, 2004

Related U.S. Application Data

(60) Provisional application No. 60/456,024, filed on Mar. 17, 2003.

(51) Int. Cl.$^7$ .............................. H04J 3/00; H04B 7/212
(52) U.S. Cl. ........................................ 370/345; 370/442
(58) Field of Search .................... 370/280, 345–347, 370/442–445, 252, 389, 392, 395.1, 395.4, 395.41, 395.42, 395.43

(56) References Cited

U.S. PATENT DOCUMENTS

| | | | |
|---|---|---|---|
| 3,944,723 A | | 3/1976 | Fong |
| 4,796,027 A | | 1/1989 | Smith-Vaniz |
| 5,285,443 A | * | 2/1994 | Patsiokas et al. ............ 370/280 |
| 5,392,223 A | | 2/1995 | Caci |
| 5,623,495 A | * | 4/1997 | Eng et al. .................... 370/397 |
| 5,630,204 A | | 5/1997 | Hylton et al. |
| 5,751,712 A | * | 5/1998 | Farwell et al. ............... 370/431 |
| 5,953,338 A | * | 9/1999 | Ma et al. ................ 370/395.21 |
| 6,026,086 A | | 2/2000 | Lancelot et al. |
| 6,125,448 A | | 9/2000 | Schwan et al. |
| 6,243,818 B1 | | 6/2001 | Schwan et al. |
| 6,278,357 B1 | * | 8/2001 | Croushore et al. ..... 340/310.01 |
| 6,324,184 B1 | * | 11/2001 | Hou et al. ................... 370/468 |
| 6,492,897 B1 | | 12/2002 | Mowery, Jr. |
| 6,718,552 B1 | * | 4/2004 | Goode ......................... 725/95 |
| 2002/0021701 A1 | * | 2/2002 | Lavian et al. ............... 370/401 |
| 2002/0133589 A1 | * | 9/2002 | Gubbi et al. ................ 709/225 |
| 2002/0178263 A1 | * | 11/2002 | Hreha et al. ................ 709/226 |
| 2003/0005130 A1 | * | 1/2003 | Cheng ......................... 709/228 |
| 2003/0037283 A1 | * | 2/2003 | Srinivasan et al. ........... 714/11 |
| 2003/0043741 A1 | * | 3/2003 | Mukai et al. ................ 370/229 |
| 2003/0088706 A1 | * | 5/2003 | Chan et al. .................. 709/250 |
| 2003/0169728 A1 | * | 9/2003 | Choi ........................... 370/352 |
| 2004/0062229 A1 | * | 4/2004 | Ayyagari et al. ............. 370/351 |
| 2004/0143663 A1 | * | 7/2004 | Leedom et al. ............. 709/226 |
| 2004/0160990 A1 | * | 8/2004 | Logvinov et al. ........... 370/509 |
| 2004/0165528 A1 | * | 8/2004 | Li et al. ...................... 370/230 |

* cited by examiner

Primary Examiner—Hassan Kizou
Assistant Examiner—Hong Soi Cho
(74) Attorney, Agent, or Firm—John P. O'Banion

(57) ABSTRACT

An apparatus and method for equitably allocating bandwidth to virtual networks operating on a common physical network, such as a power-line network for homeowners sharing a single power-line distribution transformer. An ad-hoc master is selected from the virtual power-line network controllers. The master allocates bandwidth to streams based on their priority group categorization. By way of example, four priority groups (A–D) are described into which stream priority is classified, with the highest priority group for communicating isochronous streams, the lowest priority for transferring asynchronous streams and the other priority groups for communicating streams having an intermediate level of transmission priority. Within a given priority group all bandwidth requests are fulfilled for virtual networks requesting up to their fair share of the bandwidth within the priority group, and bandwidth available from virtual networks not utilizing their full share is allocated equally amongst those requesting more bandwidth.

39 Claims, 11 Drawing Sheets

US 6,947,409 B2

BANDWIDTH MANAGEMENT OF VIRTUAL NETWORKS ON A SHARED NETWORK

CROSS-REFERENCE TO RELATED APPLICATIONS

This application claims priority from U.S. provisional application Ser. No. 60/456,024 filed on Mar. 17, 2003, incorporated herein by reference.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to power-line networks, and more particularly to allocating bandwidth between virtual overlapping networks operating over the same physical power-line network.

2. Description of Related Art

Power-line communication (PLC) is being increasingly adopted as a standard network technology, in particular with regard to the consumer electronics market. Products employing proprietary signaling formats have been known for some time, and the current trends toward standardization have seen the marketing of standard bridge, router, and other PLC network based products.

FIG. 1 illustrates a conventional PLC network shown connecting three homes H1, H2, H3 to a distribution transformer, such as a 220 VAC service by means of a neutral N and two phase legs L1 and L2. It can be seen in the right of the figure how the power is distributed through a breaker panel to individual outlets within the homes or offices.

FIG. 2 depicts an equivalent circuit representing the PLC network based within the home power distribution example shown in FIG. 1. Resistive and capacitive loads are shown distributed along the network. It will be readily appreciated from viewing these figures that the homes share the PLC bandwidth and that data communicated between PLC network connected devices within one home will be available for reception at the other homes on the same segment of the power distribution grid, posing a security threat.

Issues surrounding the use of PLC networking include both security and bandwidth utilization. To overcome security issues it is most preferable to encrypt signals being passed over the PLC network. Communication over the PLC network is facilitated by giving each device connected to the PLC network a unique ID. Communication between devices requires that the ID of a destination device be entered. The common key is encrypted with the ID and sent to the first device. All the devices in the same home share the same common key and encrypt communications with the key. A neighbor cannot decrypt the communications without the common key, and each home (or entity connected to a power line that shares a distribution transformer) uses its own common key. A common key is therefore utilized for communicating between devices on each virtual network and a unique ID (at least unique within the confines of the virtual network) identifies each device within the virtual network.

The use of key based encryption is similar to encryption utilized within a VPN (Virtual Private Network). In VPN, two remote nodes communicate through a public network (i.e. the Internet) using encryption. Although only one physical network exists, multiple overlapping virtual networks operate over it.

FIG. 3 illustrates multiple overlapping virtual networks on a power line, PL, with three devices shown connected within a home establishing a first virtual network I, another three connection nodes in another home establishing a second virtual network II, and a final three devices on connection nodes in a third home establishing a third virtual network III. It should be appreciated that the number of devices on each virtual network may vary. With each virtual network configured with its own common key, no communication typically takes place between the virtual networks. As utilized herein the term "network" will be generally considered to mean a virtual overlapping network, and not the physical network, unless specifically indicated. The physical network is called the power line or the bus.

Another issue on present-day PLC network installations is access method. Typically, CSMA/CA (Carrier Sense Multiple Access with Collision Avoidance) is utilized as it is in an Ethernet implementation. For a device to transmit, it first senses the state of the network bus. If the bus is idle, the transmission may proceed. If the bus is busy, transmission is deferred until the end of the current transmission. After deferring to a transmission, the device starts priority contention followed by a random backoff. CSMA/CA is simple and easy to connect, however, it is not generally well suited for use with an isochronous transmission, such as AV stream (audio and/or video stream), as it provides no guarantees that the data will be sent to the destination within the time necessary for providing uninterrupted display of the stream.

The use of multiple overlapping networks complicates the issue of access on CSMA/CA, because CSMA/CA provides access on a first come first serve basis. Consequently, the home that first accesses the PLC network could exclusively occupy a majority of the PLC bandwidth, for example if communicating a high definition video signal on the network. With a conventional CSMA/CA implementation, it is not possible for those which subsequently access the network to recover bandwidth from those which access it initially and retain their allotted bandwidth. This first-come first-serve allocation does not provide an equitable arrangement for many network applications, such as that of homes sharing the bandwidth of a power-line network connecting to a single distribution transformer.

Utilizing the IEEE 1394 bus standard would guarantee isochronous communications, however, it also provides bandwidth on a first-come first-serve basis. Therefore, no device can take time slots by force when the bus bandwidth is fully occupied. Furthermore, IEEE 1394 has no provisions for use on overlapping networks.

Therefore, a need exists for a system and method that provides equitable bandwidth allocation on overlapping networks, such as multiple virtual networks sharing a portion of a physical power-line. The present invention satisfies those needs, as well as others, and overcomes the deficiencies of previously developed power-line networking solutions.

BRIEF SUMMARY OF THE INVENTION

The present invention is directed toward managing the bandwidth available within a common (overlapping) network shared by a plurality of virtual networks. The invention is particularly well-suited for providing equitable sharing of the power-line bandwidth on the same last-leg portion of the power distribution system shared among multiple virtual networks, such as in neighboring homes with devices communicating over the power-line network.

It is generally presumed herein that each device connected to the power-line communications network is capable of being identified as the destination or the source of a transmission on the power-line network. The identification can be provided by encoding unit IDs within transmissions, or utilizing any other convenient means for selecting destinations and indicating the source of traffic.

The invention provides adaptive bandwidth management based on priority groups, wherein streams that are considered higher priority are granted priority in obtaining a desirable amount of bandwidth within a given priority group. The invention supports both isochronous and asynchronous streams while allocating bandwidth in response to the priority of the streams being communicated. Bandwidth allocations are based on assigning time slots to each stream based on its priority, therefore allowing each time slot to be used dynamically and efficiently. Higher priority streams can be granted a larger number of time slots than lower priority streams.

Data streams to be communicated by transmitters over the respective virtual networks are categorized within one of multiple priority groups (i.e. A, B, C, D) based on intended data stream content. Bandwidth is made available to the groups in priority order, however, even the lowest priority group is provided bandwidth equal to or above a given minimum allocation. Each priority group is therefore subject to being assigned at least a given minimum of time slots, or other bandwidth allocation units. In this way low priority streams are not left waiting indefinitely for usable bandwidth.

Bandwidth is assigned for data stream transmission within each virtual network on the basis of need when virtual networks request up to their fair share (quota) of bandwidth within the priority group. An "equal share" of bandwidth also being referred to as quota which is defined herein as the amount of available bandwidth within the priority group (i.e. number of slots) divided by the number of virtual networks on the physical network. The bandwidth available from virtual networks not using their full quota is equally shared amongst virtual networks with unfulfilled bandwidth requests within the given priority group.

Network conditions on the PLC network can vary with respect to time, leading to changes in the available bandwidth. The system is configured to dynamically allocate bandwidth to streams. The number of time slots which can be assigned will vary according to the available bandwidth, which can fluctuate in response to electrical noise on the power-line or other conditions.

The system provides bandwidth allocations in a manner that is generally transparent to the user. If, however, user bandwidth is cut dramatically the system is preferably configured to notify the user. For example, a first user is passing high resolution video streams over the network and utilizing the majority of the available bandwidth, a second user then accesses the network and is fairly allocated bandwidth by the system for their high definition stream, wherein the bandwidth provided to the first user is reduced by the system of the present invention to accommodate a fair bandwidth allocation to the second user. The system is configured so that it can notify the first user of the drop in available bandwidth, and the user or the equipment utilizing bandwidth on behalf of the user, can reconfigure bandwidth utilization such as lowering the number of streams, framing rates, resolutions, and so forth.

Although the system may be implemented as a separate PLC control device, it is preferably implemented in software executing on a device controlling power-line access within a virtual network, such as upon an AV server controlling communication within a household over a PLC network, or alternatively within a set-top box, computer server, television set, audio and/or video recording device, audio and/or video playing device, or other device configured for communicating and/or manipulating audio and/or video streams. The system may comprise programming executable on a computer device for carrying out the operations described herein. The programming may be provided by way of a media containing the programming code which may be executed on a computer. The system may contain hardware, including a computer element, which can execute the programming.

The present invention may be generally considered an apparatus for managing bandwidth allocated to virtual networks on an overlapping physical network, comprising: (a) a device connected to a physical network and configured to communicate with at least one other device connected to the physical network; and (b) means associated with at least one device (connected on the network) for dynamically allocating bandwidth to each virtual network on said physical network, and for reallocating the bandwidth if sufficient bandwidth on the physical network is not available to simultaneously support bandwidth requirements of the virtual networks.

Typically the means for dynamic allocation is provided by a programmable element which executes programming for allocating bandwidth, by way of example the programmable element may be a computer processor embedded within a device. The programming categorizes isochronous data streams into groups of high priority with asynchronous data streams being categorized into lower priority stream, wherein the high priority stream receives priority with regard to receiving a requested amount of bandwidth. To prevent bandwidth requests from lower priority streams from being deferred indefinitely, the programming preferably comprises means for establishing a lower limit on the amount of bandwidth to be allocated to a stream of a given priority.

The programmable element may be implemented as a computer processor (CPU, microprocessor, or similar element capable of executing programmed instructions) within a device configured for communicating over said physical network with other devices. The programming executing on the computer is configured for (a) dividing the available bandwidth of the physical network into assignable units, (b) categorizing streams for transmission over the physical network into priority groups, (c) assigning sections of bandwidth (multiple bandwidth units that are preferably contiguous) to the priority groups in response to the bandwidth requirements of the streams and the transmission priority of the priority group, (d) assigning units of bandwidth to specific streams within each of the priority groups in response to an equitable sharing of bandwidth between the virtual networks sharing the physical network. The preceding steps may also be considered a method of managing bandwidth allocated to virtual networks on an overlapping physical network.

Quantization into bandwidth units is preferably performed in the system with small enough bandwidth units to suit typical stream bandwidths while limiting bandwidth waste. It should be recognized that streams requiring less than a unit would require a full unit, while streams requiring just over one unit would use two full units, in each case wasting almost a full unit of bandwidth. Therefore, it is preferred that the bandwidth unit be selected of sufficiently small size wherein typical streams require a number of bandwidth units, thus limiting bandwidth waste.

It will be appreciated that the computer processor may be retained in a separate unit or integrated within a set-top box, computer server, television set, audio and/or video recording device, or audio and/or video playback device. It will be further appreciated that the programming executable on the computer for performing the steps according to the present invention may be stored on a computer readable media, or distributed by downloading, or other data communication means, without departing from the teachings of the present invention.

A number of aspects of the present invention are described herein, it should be appreciated that these aspects may be implemented separately or in various combinations thereof, without departing from the teachings of the present invention.

An aspect of the invention provides equitable bandwidth management for each virtual network within a communication system supporting multiple overlapping virtual networks.

Another aspect of the invention prevents any one virtual network (i.e. home) from monopolizing the available bandwidth when other virtual networks are requesting bandwidth.

Another aspect of the invention provides for adaptive bandwidth management based on priority groups, wherein streams of higher priority are granted priority toward obtaining a desired amount of bandwidth.

Another aspect of the invention provides for adaptive bandwidth management wherein bandwidth requests from low priority streams are not deferred indefinitely.

Another aspect of the invention provides for adaptive bandwidth management which takes into account varying bandwidth availability over time.

Another aspect of the invention provides adaptive bandwidth management which integrates with AV dynamic rate control so that graceful stream degradation is supported in response to lowering the bandwidth assigned to a given stream being transmitted on the virtual network.

A still further aspect of the invention provides an adaptive bandwidth management system that may be implemented in software within systems or devices controlling virtual networks operating on the power line network.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Referring more specifically to the drawings, for illustrative purposes the present invention is embodied in the apparatus generally shown in FIG. 4 through FIG. 10B. It will be appreciated that the apparatus may vary as to configuration and as to details of the parts, and that the method may vary as to the specific steps and sequence, without departing from the basic concepts as disclosed herein.

1. Detail of Network Bandwidth Management System and Method.

1.1 Power Line Network.

Figure 1:
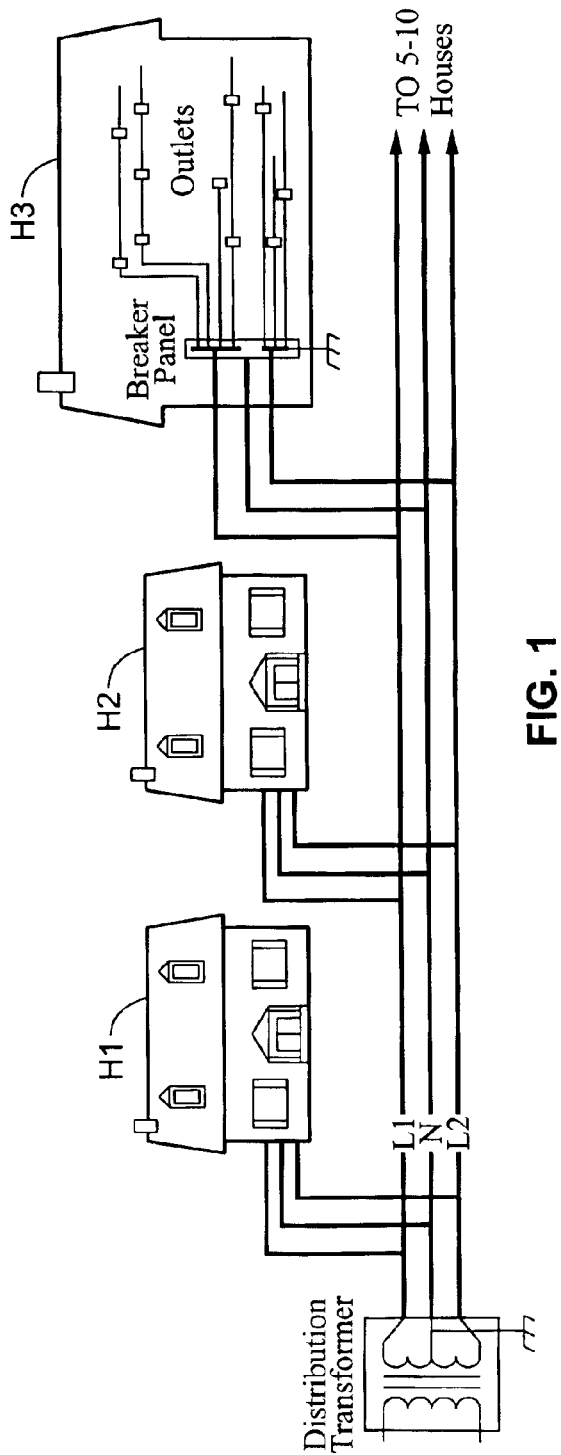
FIG. 1 is a block diagram depicting a portion of a conventional power-line communication (PLC) network showing a number of homes connected to a single power distribution transformer.
Figure 2:
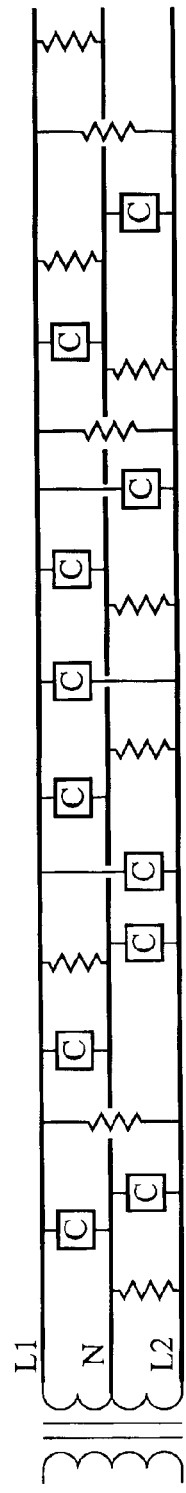
FIG. 2 is a schematic of a conventional power-line communication (PLC) network.
Figure 3:
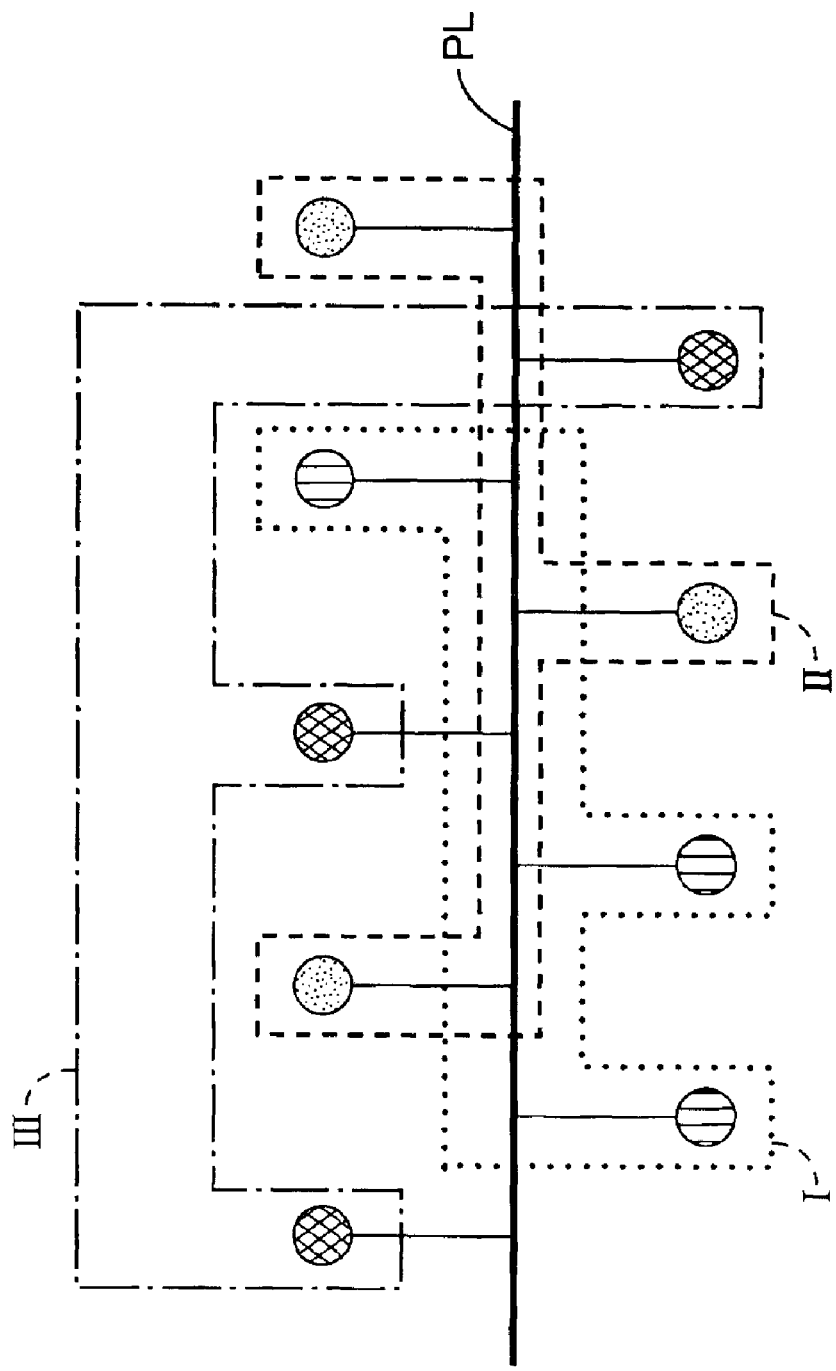
FIG. 3 is a node diagram of devices connected to a power-line communication (PLC) network, showing each device belonging to one and only one of three virtual networks.
Figure 4:
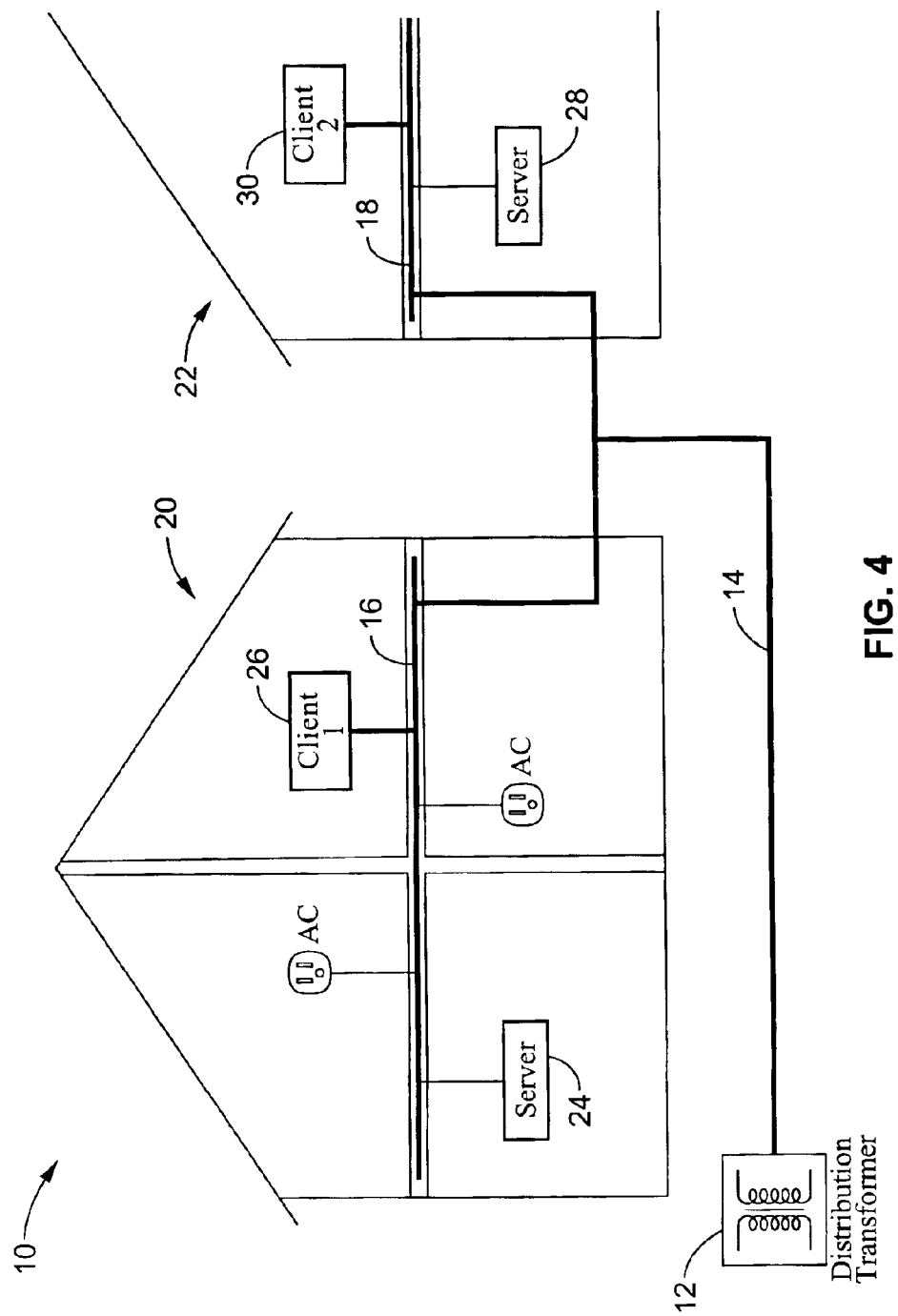
FIG. 4 is a block diagram of a portion of a power-line communication network spanning two homes, showing servers and clients configured for communicating with one another within each virtual network according to an aspect of the present invention.

FIG. 4 shows an example of a power-line network 10. Distribution transformer 12 sends AC power over power-lines 14 to the power-line networks 16 and 18 within homes 20 and 22. In home 20, a server 24 and client 26 are connected into power-line network 16. Similarly, in home 22, a server 28 and client 30 are plugged into power-line network 18. Unused AC power outlets are shown within house 20 to which additional powered devices may be connected for control over the power-line network, or for conventional power distribution purposes.

From the perspective of network user's within each home 20, 22, it appears that they have a private network for communicating over the power line between the server and the devices. However, it is readily apparent from the figure, that all these clients and servers communicate over a shared physical network extending from the secondary of distribution transformer 12. Although only two homes are shown connecting to the power-distribution transformer, in reality, several homes typically share the output from a given power distribution transformer. As a result, the operations of server 24 and server 28 and the devices connected thereto are interdependent, and optimal fair sharing of the bandwidth requires that servers 24 and 28 cooperate in controlling the use of bandwidth within their respective virtual networks, in this case extending to all power-line control devices connected within the specific home.

The present invention is configured for providing cooperative sharing of the bandwidth within overlapping networks, such as overlapping virtual PLC networks. The invention is configured to provide bandwidth management despite the effects of power-line noise and unstable conditions on the power line. One preferred implementation of the system is based on orthogonal frequency division multiplexing (OFDM) technology. To establish stable connections on an unstable power-line medium, each device on the power-line exchanges carrier information and best carriers are chosen each time a communication is executed. Bandwidth is preferably managed based on a time division multiple access (TDMA) mechanism, wherein bandwidth is parceled out as time slot portions of the bandwidth. It should be appreciated that bandwidth may be alternatively distributed as frequency ranges, or a combination of frequency ranges and time slots, or other forms of packetizing available bandwidth for use by streams. These alternative bandwidth distribution mechanisms may be adopted without departing from the teachings of the present invention.

To simplify coordination between servers, the present system is preferably configured to designate one of the servers, operating on the physical network bounded by the distribution transformer, as a bus master. No special monopolistic operations are accorded to the bus master and bus master selection may be determined in any convenient manner. In the present embodiment, upon connecting a server to the power-line system, the server attempts to detect the presence of a bus master. If no bus master is found, then the newly connected server takes on the role of bus master. Upon disconnection of an active master, another device operating on the power-line network will become the new bus master. The master functions (according to a TDMA implementation) to split the time axis into fixed length cycle frames, with each frame including a fixed number of time slots.

The bus master preferably splits the available access time into fixed length time cycles. A time cycle is divided to a fixed number of time slots, for example, 100 time slots. The master assigns one of more time slots to each stream. The time slot(s) will be used for the stream every cycle until the stream terminates. To start a stream, a sender requests time slots from the master. Since timing is critical on isochronous streams, at least a certain number of time slots are reserved for it. If bandwidth permits, then every stream obtains sufficient time slots as requested to suit optimal operation, because sufficient time slots are available for allocation by the master. However, if insufficient bandwidth exists for all streams, then the master reassigns time slots to accomplish fair sharing between the virtual networks within the stream group priorities. The master implemented according to the present invention, therefore, reassigns time slots in an equitable sharing arrangement for use by streams communicating within each virtual network sharing the power line.

1.2 Server.

Figure 5:
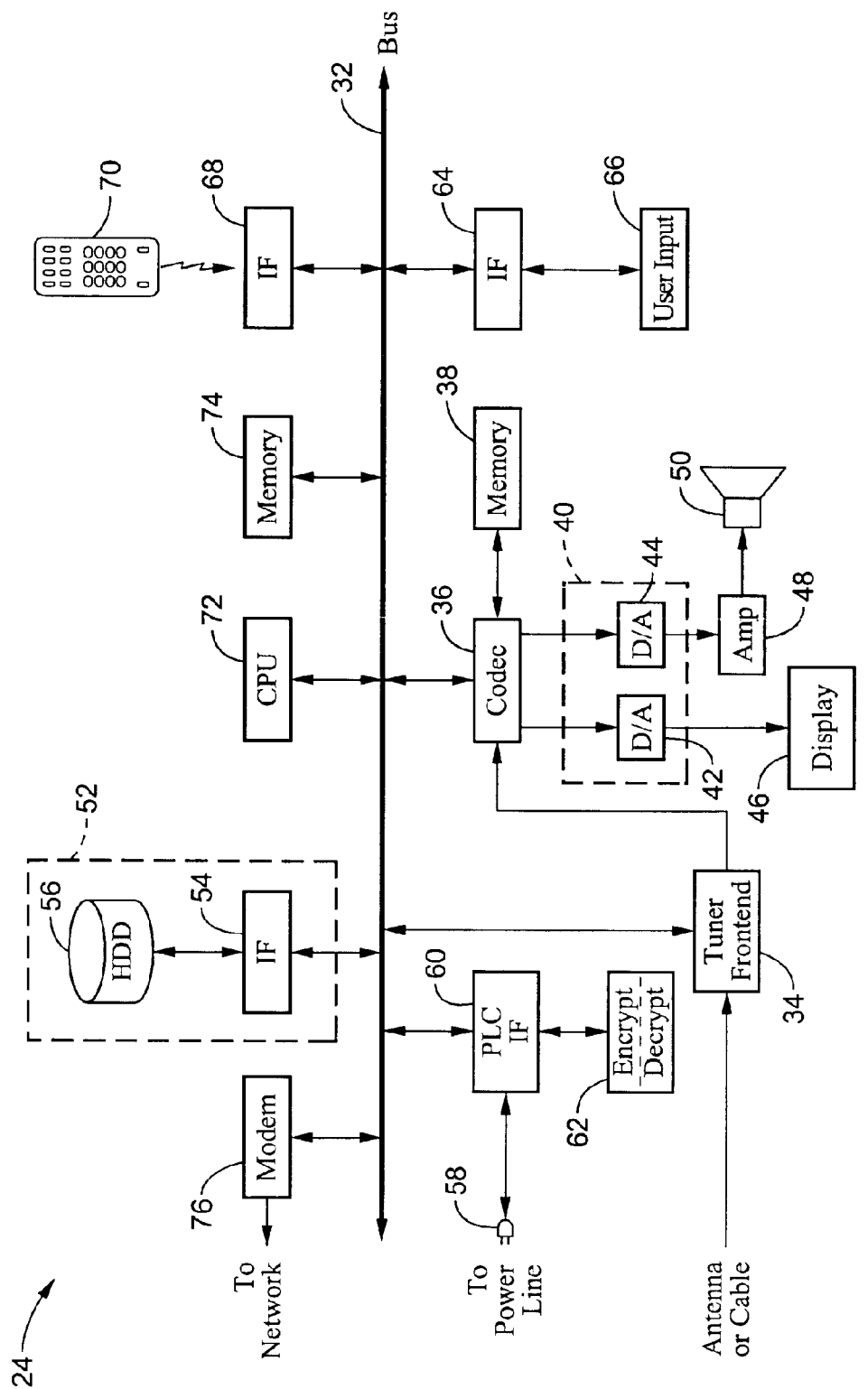
FIG. 5 is a schematic of a server configured for communicating audio and video streams over a power-line communications network according to an aspect of the present invention.

FIG. 5 depicts functionality within server 24 shown with internal bus 32. A tuner front-end 34 is configured for receiving a RF signal from an antenna or a cable network. Codec block 36 in combination with memory 38 decodes the demodulated signal from tuner front-end 34. The decoded digital video signal is then converted by conversion stage 40 for display and/or audio output. By way of example, digital-to-analog conversion stages 42, 44 are depicted for generating analog signal outputs for driving a display 46 and audio system comprising amplifier 48 and audio transducer 50, such as one or more speakers. It should be appreciated that codec block 36 and converter stage 40 may be configured to support any desired audio or video standard for playing an AV stream.

The AV stream can be transferred by codec 36 over bus 32 to a data storage subsystem 52 for recording. Data storage subsystem 52 is exemplified with a storage interface 54 shown connected to a hard disk drive 56. It will be appreciated that other forms of data storage may be utilized additionally or alternatively in place of hard disk drive 56, for example solid state storage, removable media storage, and so forth. To replay a recorded stream, codec 36 receives the stream from data storage subsystem 52 over bus 32 and decodes it for output.

Server 24 can send or receive video streams over the PLC network from clients which may comprise video imagers, display devices, recording and playback devices, and the like. AV streams encoded on the AC power may be received through AC power plug 58 to PLC interface 60 in conjunction with encryptor/decryptor 62, similarly AV streams may be transmitted in the reverse direction. For example, an AV stream can be received from tuner front-end 34 and sent through codec 36 by way of bus 32 to PLC interface 60 in combination with encryption/decryption circuit 62, from where it is communicated by AC power plug connection 58 over the power-line network 16 to client 26. Previously recorded streams may be accessed from data storage subsystem 52 and sent to the PLC interface 60 and encryption/decryption unit 62 for communication to client 26 over the power-line network 16. Streams may be received from clients over the PLC network into PLC interface 60 and encryption/decryption unit 62, which are passed through bus 32 to Codec 36 for playback, or recorded (fully or partially) on the data storage system 52.

It should be appreciated that multiple data storage elements may be supported within the present invention, such as a hard disk drive used in combination with a removable media drive (i.e. writable optical DVD drive), allowing rapid archival access to data and streams. To ensure security of the virtual network connections over the physical power-line distribution network which is typically bounded by a distribution transformer, PLC interface 60 is shown in combination with encryption/decryption unit 62, which is preferably provided to encrypt data prior to transmission and to decrypt data that has been received.

User control of server 24 may be provided within the system by any convenient method. By way of example, input commands are depicted being received through a command interface 64 from a user input device 66, such as a keypad, keyboard, discrete buttons, cursor control device (pointing device), other input sources and combinations thereof. Server operations may be remotely controlled through a wireless interface 68, receiving input from a wireless device 70, such as a remote control unit utilizing infrared (IR) communication, wireless communication, and so forth.

Commands received through interfaces 64, 68 are communicated over bus 32 to a control unit, central processor 72 that operates in conjunction with memory 74. Programming according to the present invention may be stored within memory 74 for execution by central processor 72. It should be noted that the present invention may be implemented as programming that executes within conventional video hardware supporting a power-line interface and the requisite hardware elements to support the desired applications.

Additional communication channels may be supported on client 24 for communicating with local devices on separate wing or wireless links, or for communicating to remote devices located beyond the last leg section of a power-line network. By way of example, remote communication may be supported by modem 76, which may be provided by any form of communication modem or gateway, although high speed connections such as through a cable modem or an xDSL modem are preferred. The remote communication channel is particularly well suited for communicating data and streams from, and to, a wide area network, such as the Internet.

1.3 Client.

Figure 6:
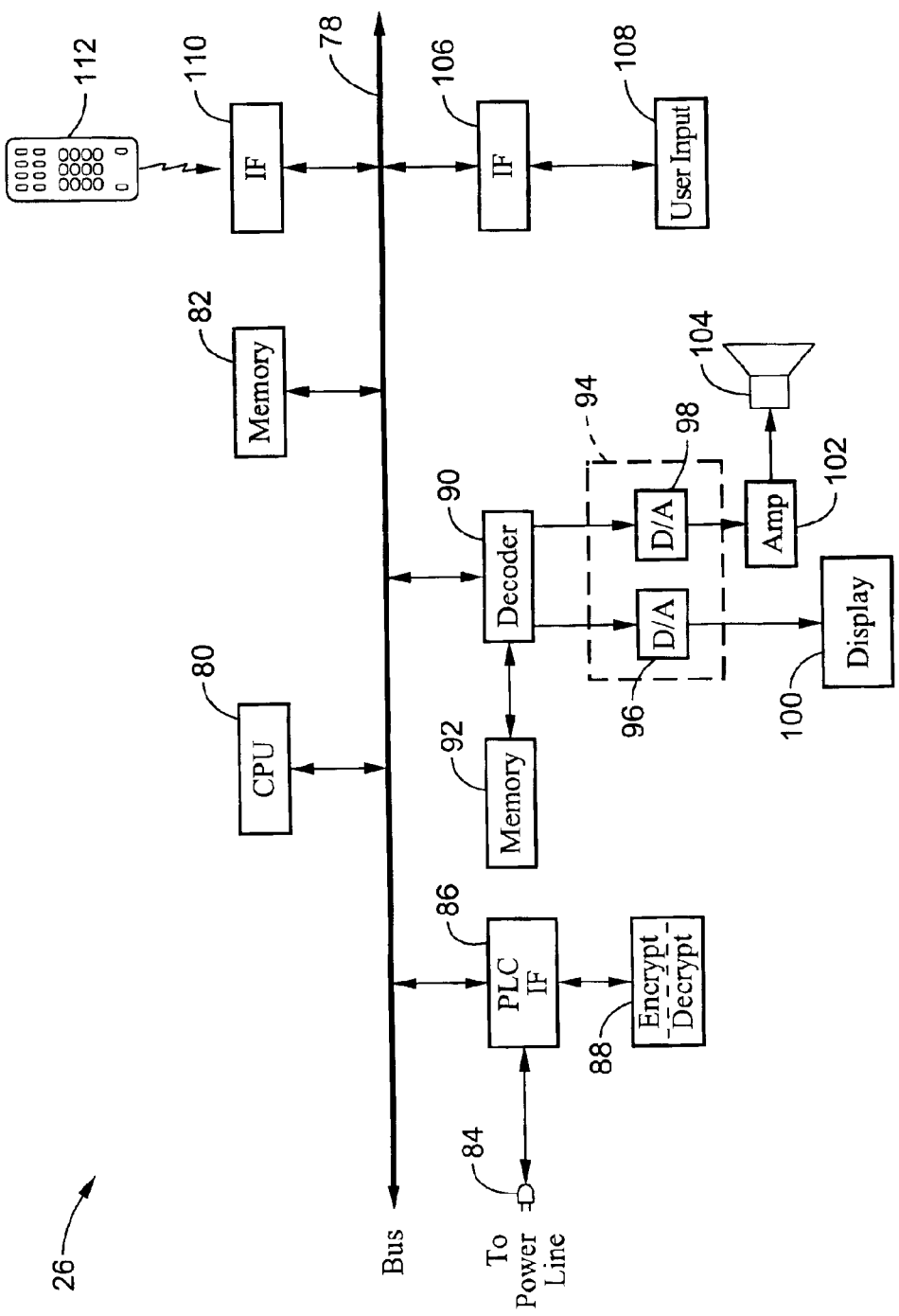
FIG. 6 is a schematic of a display device configured for receiving audio and video streams over a power-line communications network according to an aspect of the present invention.

FIG. 6 depicts functionality within a representative client 26 having internal bus 78. A central processor 80 in combination with memory 82 is shown for controlling each component over bus 78. Programming executable on central processor 80 controls the hardware of client 26 according to the functions of the present invention. Additionally, memory 82 may retain variables, buffers, temporary data storage, and so forth. An AC power plug connection 84 is shown connecting to the power-line and routing signals to a PLC interface 86 in combination with encryptor/decryptor 88. Signals received over the PLC network through PLC interface 86 are passed to decoder 90 in combination with memory 92, prior to being output to the user. The decoded digital video signal is then converted by conversion stage 94 for display and/or audio output. By way of example, digital-to-analog conversion stages 96, 98 are depicted for generating analog signal outputs for driving a display 100 and audio system comprising amplifier 102 and audio transducer 104, such as one or more speakers. It should be appreciated that decoder 90 and converter stage 94 may be configured to support any desired audio or video standard for playing an AV stream.

User interfaces may be supported on client 26 in a similar manner as they are supported on the server. An interface 106 is preferably provided to an input device 108, such as a keypad, keyboard, discrete buttons, cursor control device (pointing device), other input sources and combinations thereof. Client operations may be remotely controlled through a wireless interface 110, receiving input from a wireless device 112, such as a remote control unit utilizing infrared (IR) communication, wireless communication, and so forth.

Although client 26 is shown for receiving a stream over the power-line network, it will be appreciated that clients may be alternatively, or additionally, configured for transmitting video streams, such as from a video imaging device, or other forms of data.

1.4 Network Communication.

Consider the situation in which it is desirable for server 28 to send a data stream to client 30. The present invention generally refers to the data being passed over the PLC network as a "stream", however it should be appreciated that other forms of data may be passed in conjunction with or as an alternative to a stream. Stream data may be generally considered isochronous, asynchronous, or a combination of the two. The transmitter, server 28, requests from the master (server 24) sufficient time slots to send the stream. The request must be handled by the master as it manages the allocations of the available time slots. The master returns a response to inform the transmitter of the time slots it is being assigned. The transmitter commences stream transmission using the assigned time slots. It will be appreciated that the master adjusts the slots available for assignment in response to changes in available bandwidth, requests for bandwidth, and prioritization of bandwidth requests.

For example, as the bus becomes so busy in response to bandwidth requests that not all bandwidth requests can be simultaneously fulfilled, then the master may assign fewer time slots to a stream than requested by the transmitter. In this case, the transmitter must adjust its data encoding rate to fit the given bandwidth. After the transmitter terminates the stream, it informs the master that the given time slots are no longer in use, whereas the master reassigns the time slots to other streams. For slot management communications, one or more time slots may be reserved and are thus not available at any time for carrying isochronous or asynchronous streams. The following sections describe how the master manages time slots.

2. Time Slot Reassignment Algorithm.

2.1 Priority Groups.

Before a device transmits a new stream, it requests time slot assignments from the master. In response, the master assigns time slots to the device, yet is not always able to assign the number of time slots requested by the transmitting device. If insufficient time slots are available for use, then the master reassigns slots based on the network priority and the priority of the stream.

By way of example, the present invention may be configured with four priority levels, group A, B, C and D. Group A has the highest priority and group D has the lowest. An isochronous stream is categorized to group A or B, while an asynchronous stream is categorized to group C or D. For example, VoIP (Voice over IP) and a live-recording audio or video stream are categorized in group A. It will be appreciated that since it is impossible to retrieve live-recording data, it should be given the highest priority. A playback audio/video stream is considered to be in group B. Web accesses are provided for in group C, while file transfer are considered to be in group D. It should be recognized that different implementations of the system may define these priority groups in different ways without departing from the teachings of the present invention. The present invention is preferably configured for allocating a guaranteed minimum number of time slots for a request according to each group under any condition so that even low priority streams are regularly serviced, albeit with a small bandwidth allocation.

2.2 Network Priority.

Several virtual networks may operate on a single physical power-line network, as a number of homes may share a given power distribution transformer. The practice of allocating bandwidth on a first-come, first-serve basis is not equitable in the present PLC network application or in similar situations of overlapping virtual networks, because the first user may monopolize more than their fair share of the bandwidth constraining the operation of peers attempting to communicate over the network. Consider an example, wherein a first home is utilizing 95% of the entire power-line bandwidth, as a second home accesses the network and requires 20% of the bandwidth. Under a first-come first-serve basis the user at the first home may continue to monopolize the bandwidth, while the second home is unable to obtain sufficient bandwidth for their desired operation.

In contrast, the present invention fairly allocates bandwidth to solve this problem. Time slot portions of the bandwidth are assigned according to need up to an equal share of available bandwidth, after which available bandwidth is divided equally among those requesting additional bandwidth. Reallocations are performed to dynamically adjust bandwidth allocation in response to new bandwidth requests, stream terminations, overall physical network bandwidth changes, and so forth.

2.3 Time Slot Reassignment.

The method of allocating bandwidth within the present invention is based on time slots which can be assigned or reassigned to each request on the virtual network. The time slots are preferably allocated in response to the priority of the data (i.e. stream) to be transmitted. The assignment/reassignment is performed within the present invention by a time slot reassignment algorithm which is substantially applied independently to each priority group.

Parameters are input to the algorithm, preferably including:

(a) requested number of time slots per each stream;
(b) priority group name of each stream (i.e. group A, B or Q);
(c) targeted total number of slots for each group.

The algorithm returns:

(a) reassigned slot number for each stream;
(b) total number of slots for each group allocated as equal to or less than the targeted number.

If insufficient time slots are available to meet the requirements for the group, then a time slot reduction is performed. In this case all or some of the streams are then assigned fewer time slots than have been requested. When slot reduction is required, the master is configured to preferably send a command/notification of the time slot reductions to the stream transmitter. When the stream is rate adjustable, such as for certain audio or video streams, the transmitter reduces the encoding rate to fit the new narrower available bandwidth (according to the fewer time slots allotted) thus providing graceful degradation in response to lowered bandwidth. When a stream is not rate adjustable, for example an asynchronous stream, no rate adjustment is performed, because the reduction in available time slots only causes a slowdown or a halt in the stream transfer.

Parameters of the time slot reassignment algorithm may be defined as follows:

k—total network number;
i—network index ($0 \leq i < k$);
j—stream index ($0 \leq j < strm(i)$);
T—targeted total slot number;
p—number of streams with no reduction (i.e. r(i)=1);
strm(i)—total stream number on network i;
r(i)—reduction ratio of network i ($0 \leq r(i) \leq 1$),
If r(i) is 1, no reduction performed;
s(i,j)—slot number originally requested by stream j on network i;
U(i)—slot number originally requested by network I;

$$U(i) = \sum_{j=0}^{Strm(k)} s(i, j)$$

δ(x,y): Kronecker's delta function
  δ(x,y)=1 if x=y;
  δ(x,y)=0 if x≠y;

min (x,y): minimum function
  min(x,y)=x if x≤y;
  min(x,y)=y if x>y;

$$T = \sum_{i=0}^{k-1} r(i)U(i)$$

Figure 7:
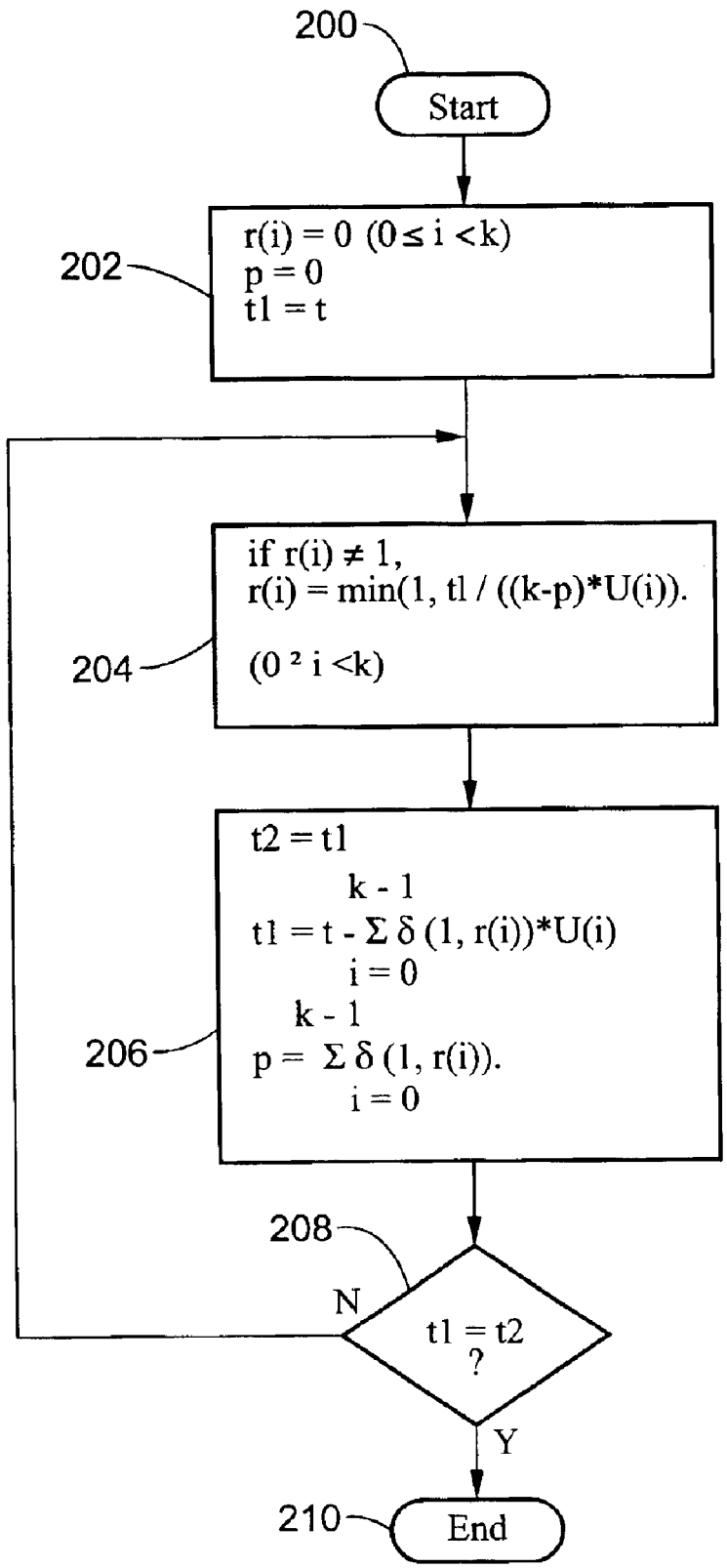
FIG. 7 is a flowchart depicting slot reassignment according to an aspect of the present invention.

FIG. 7 illustrates an example of slot reassignment. After commencing to execute the procedure at block 200, the variables r(i), p, and t1 are initialized at block 202. The value r(i), is then determined as represented by block 204, with values t1, t2, and p being determined as per block 206. The values of t1 and t2 are compared as per block 208, with execution completing at block 210 if t1=t2, or blocks 204, 206 repeated until t1=t2.

2.4 Examples of Time Slot Reassignment within a Priority Group.

The following examples are provided as an aid to understanding the reassignment process within a priority group. Consider a scenario (case) in which three homes (each with its own virtual network n0, n1, and n2) share a power-line distribution system (k=3). Assume now that ninety time slots (90) are assigned to group A, and the targeted total slot number, T, is ninety (90). In response to busy traffic conditions on virtual networks n0, n1, and n2, thirty (30) time slots should be assigned to each virtual network. It will be appreciated, therefore, that time slot allocations within each priority group are managed across the breadth of virtual networks which share the bandwidth of the physical network, such as the last-leg of the power-distribution system in the case of a PLC network. Additional cases are outlined below in which reassignment is considered.

2.4.1 Case 1.

The three networks request slots as follows: n0=30 slots, n1=25 slots, and n2=20 slots. Because the total number of slots requested, 75, is less than the number of slots available, 90, the three networks all obtain the number of slots requested and no slot reduction is performed.

2.4.2 Case 2.

The three networks request slots as follows: n0=50 slots, n1=20 slots, and n2=15 slots. Although network n0 requests the majority of time slots, 50, the total number of time slots requested is still below the available time slots, 90, wherein network n0 is provided with the requested 50 time slots, while the other networks are accorded their requested number of time slots. It should be appreciated that uncommitted extra time slots may be allocated to a network beyond those within the quota.

2.4.3 Case 3.

The three networks request slots as follows: n0=50 slots, n1=25 slots, and n2=20 slots. Network n0 again requests the majority of time slots, 50, and the total number of time slots requested is now beyond the available time slots, 90. A fair allocation of the available 90 time slots would give each virtual network 30 time slots as an equitable "quota". As insufficient bandwidth exists to fulfill all requested time slots, and because network n0 is exceeding its time slot quota, 5 time slots are taken from network n0, so that the traffic fits within the available bandwidth.

The reassigned time slots would be as follows: n0=45 slots, n1=25 slots, and n2=20 slots. It should be appreciated that the bandwidth provided to virtual network n0, is only ten percent less than the number requested, so for example if 5 Mbps video stream traffic were being sent on n0, then the adjusted rate would be dropped to 4.5 Mbps. It should be recognized that this total data rate for n0 comprises a total bandwidth associated with one or more streams, for example one stream may have utilized 30 time slots while another stream utilized 20 time slots.

2.4.4 Case 4.

The three networks request slots as follows: n0=50 slots, n1=40 slots, n2=20 slots. The total requested time slots in this case are 110, which exceeds the available 90 time slots. Virtual networks n0 and n1 both exceed their fair share quota of 90/3=30, while n2 requests only 20 time slots, which is below its quota of 30 for this situation. The system allocates the 20 time slots to n2 and splits the remaining bandwidth equally between the two virtual networks that are requesting more than their fair share (quota) of the available bandwidth. Therefore, n0 and n1 each receive (90-20)/2 time slots, with allocations being as follows: n0=35 slots, n1=35 slots, and n2=20 slots.

It should be appreciated from these examples and the associated discussion that the present invention can equitably share the available bandwidth amongst a number of virtual networks. The time slot allocations are described by way of example, and the method may utilize different criterion for sharing, including various forms of weighting, without departing from the teachings of the present invention.

2.5 Additional Aspects of Time Slot Reassignment.

The system is preferably configured for supporting fixed-rate (non-scalable) streams, wherein a transmitter can prohibit the master from applying slot reduction to the stream. Reducing the transfer rate of a fixed-rate stream can disrupt the ability to utilize the stream. Therefore, in adjusting bandwidth allocation, the system is configured to selectively apply slot reduction to scalable streams and asynchronous streams.

The master is also configured so that it may refuse reassigning time slots to accommodate a new stream when the bus is already busy. The minimum slots for each priority group are preferably allocated at a fixed place in a cycle frame. For isochronous streams, the master assigns consecutive slots, with the remaining fragmented time slots being allocated for asynchronous streams.

3. Bandwidth Management Algorithm.

3.1 Time slot management for a New Stream.

Allocation of time slots within a given priority group has been described, which is extended to an embodiment of the invention for allocating time slots between priority groups. When a transmitter is in need of sending a stream to another device, the transmitter requests sufficient time slots from the master for sending the stream. If the bus is not busy and the slots are available, the transmitter is allocated the requested slots. However, if the bus is busy and not enough slots are available, then the master reassigns time slots based on priority to accommodate the new transmissions.

Figure 8A:
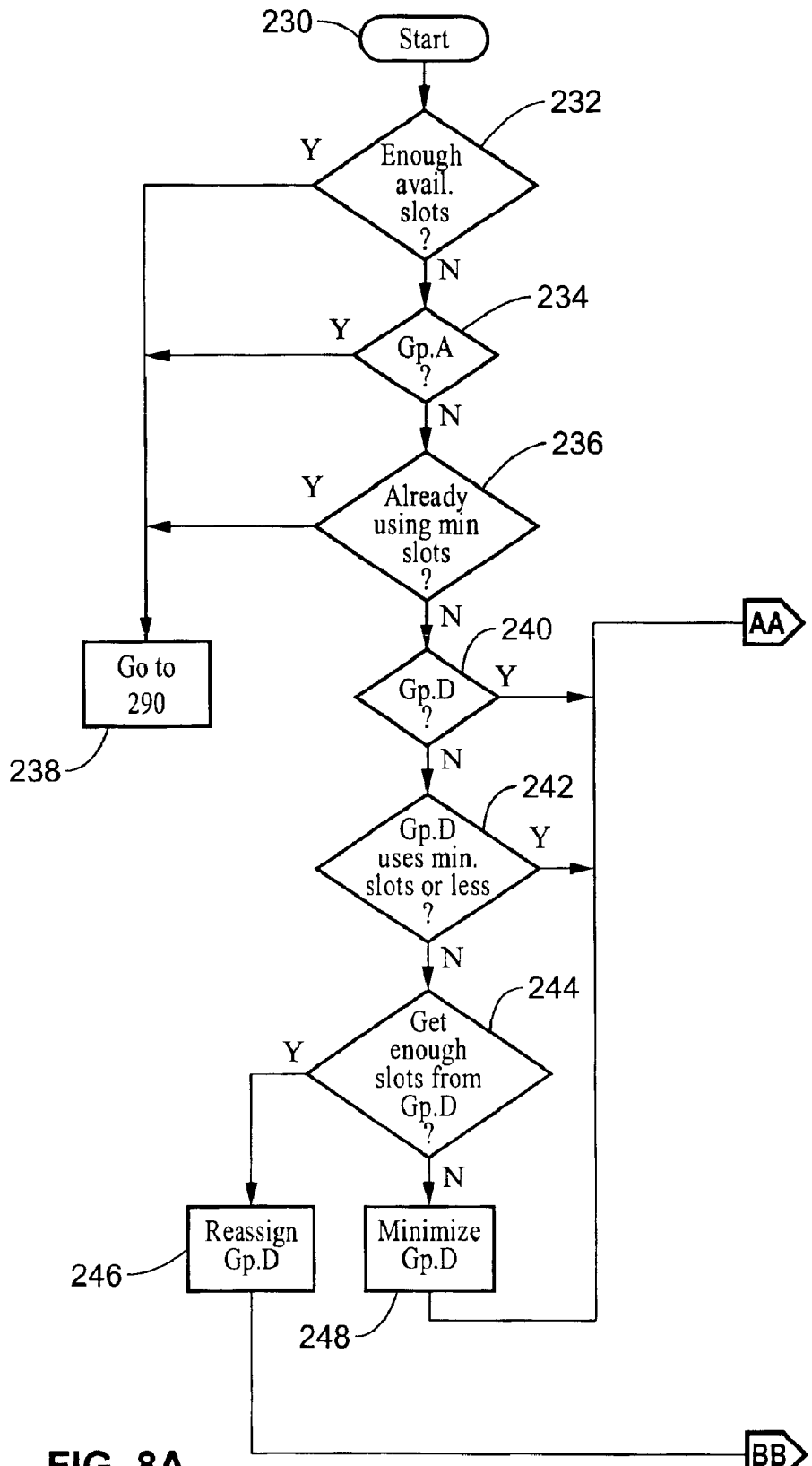
FIG. 8A is a flowchart depicting a minimum slot assignment process within bandwidth management programming for a power-line communications network according to an aspect of the present invention.
Figure 8B:
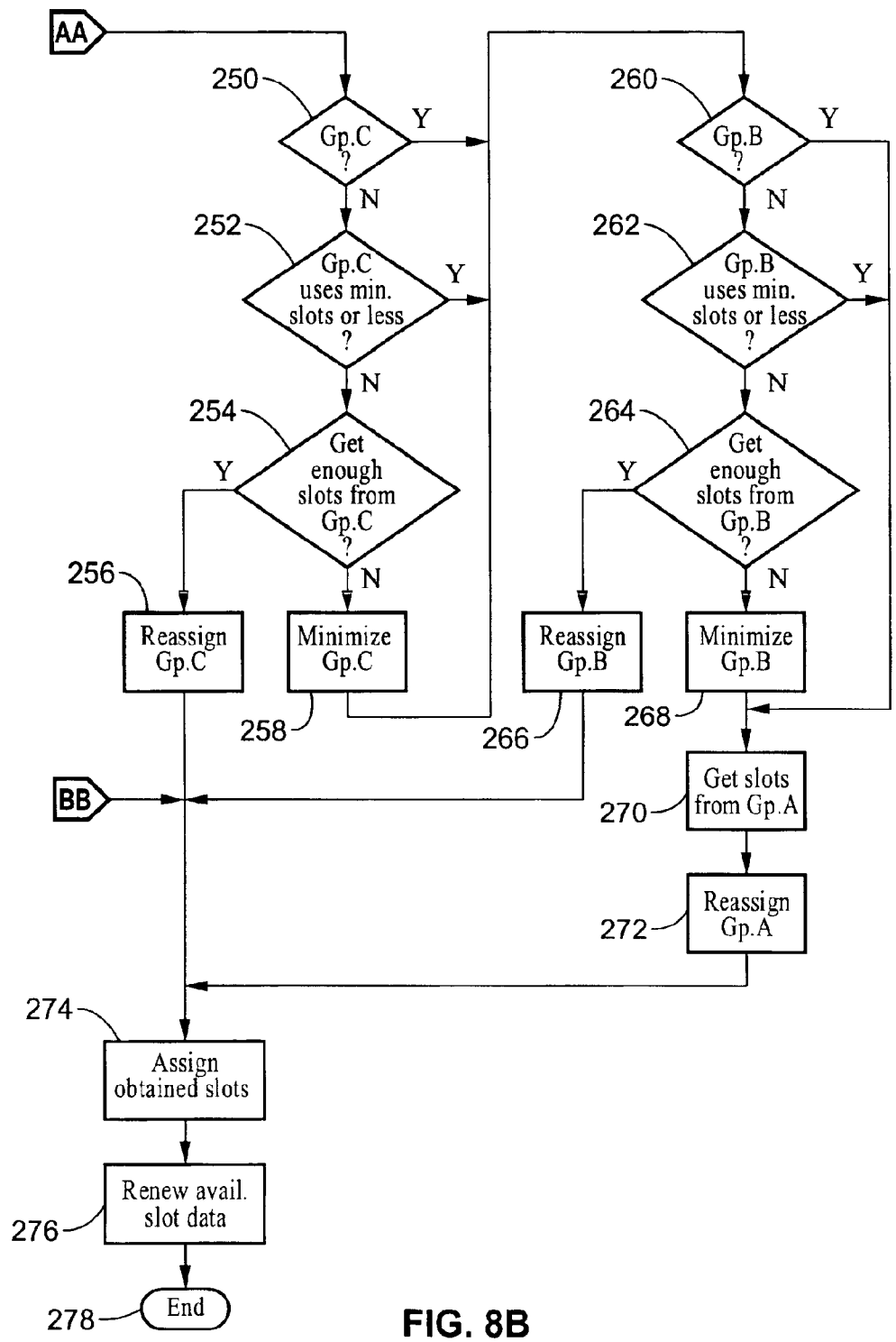
FIG. 8B is a flowchart which is a continuation of FIG. 8A.

FIG. 8A and FIG. 8B illustrate an example of minimum slot assignment programming wherein unused timeslots are recovered from priority groups that are not utilizing their minimum time slot allocations. In this process if insufficient bandwidth exists to fulfill all requests, then streams only retain their minimum slot allocation when those slots are used, the unused slots being reclaimed for use by other priority groups.

The blocks labeled "Reassign of Gp. X" and "Minimize of Gp. X" are performed by executing the slot reassignment algorithm described previously, wherein X is selected within the set of groups {A, B, C, D}.

Figure 9:
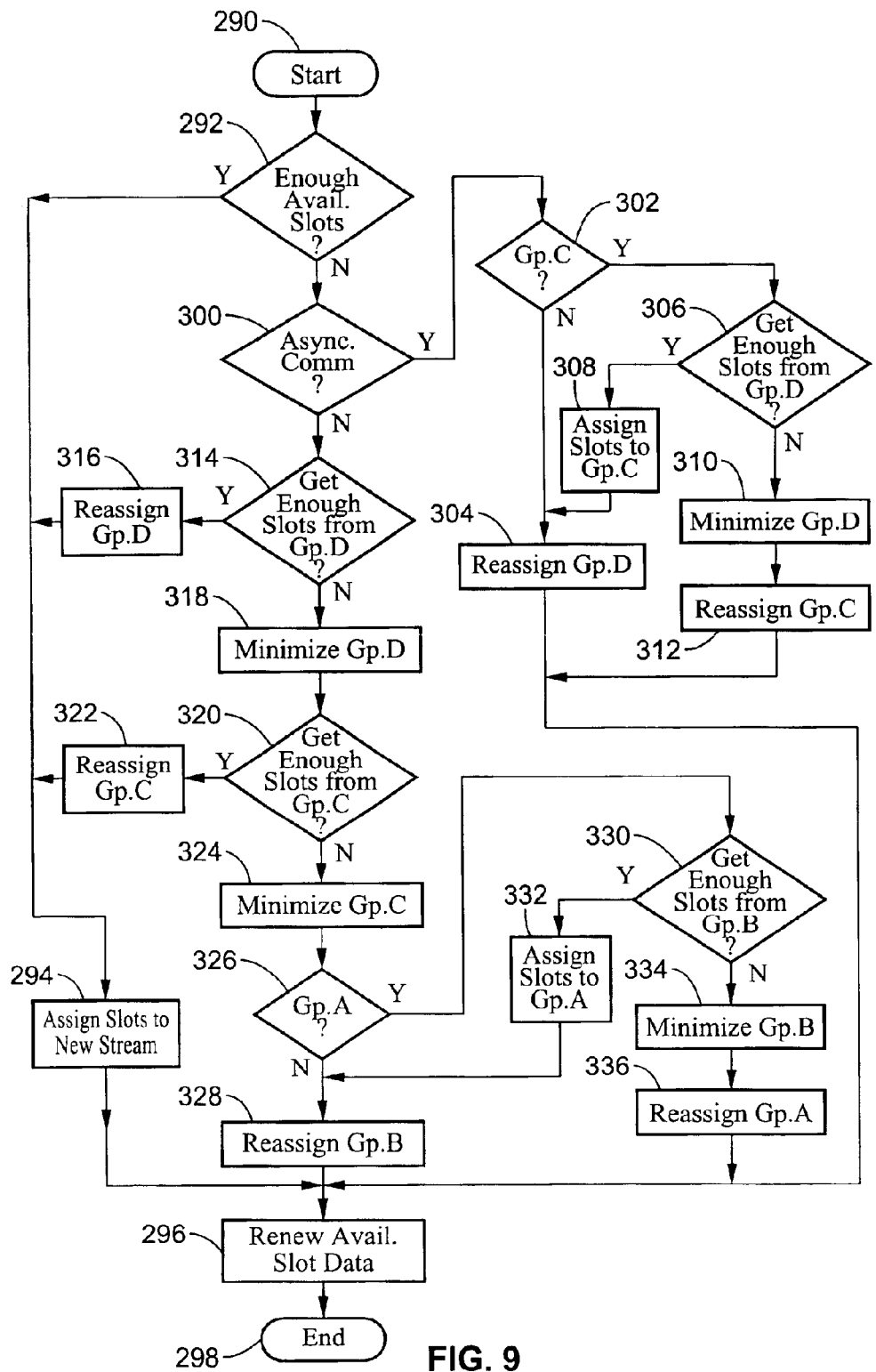
FIG. 9 is a flowchart depicting a slot allocation process within bandwidth management programming for a power-line communications network according to an aspect of the present invention.

After a request for transmitting a new stream, execution of the minimum slots assignment is performed and if required, the bandwidth management programming commences as represented at block 230, and it is determined at block 232 if sufficient time slots are available to fulfill all the bandwidth requests. If sufficient bandwidth exists, then block 238 is executed and the algorithm shown in FIG. 9 is performed from block 290.

If it is determined at block 232 that insufficient time slots exist to accommodate all requests, then the nature of the new stream request is checked as per block 234. If the request falls into group A, block 238 is executed. If the request is not group A, block 236 is executed to determine if the group is already using the minimum or more slots, wherein block 238 is executed linking to FIG. 9. If the minimum slots are not being used, block 240 checks for a group D request, which is routed to block 250 is performed to check for group C and so forth. However, if it is another group (B or C), then block 242 is performed to determine if group D is utilizing a number of slots that is less than or equal to the minimum slots allocation.

At block 242, if group D is found to utilize more than the minimum slots, block 244 is executed with slots being obtained. If enough slots can be obtained from group D, reduced slots are reassigned to group D at block 246. After block 246, obtained slots are assigned to the group at block 274 and the available slot data is renewed at block 276, with the process ending as represented by block 278.

If insufficient slots are obtained as per block 244, the allocation of slots for group D is minimized at block 248 and block 250 is executed to get slots from another group.

Block 250 to 258 and block 260 to 268 are similar to block 240 to 248. From the lowest prioritized group D to the highest prioritized group B, slots exceeded the minimum number are assigned for the new stream.

If enough slots are not available from any of group D, C and/or B, slots are taken from group A. Slots are taken from group A as represented by block 270 to obtain the minimum slots, and reduced slots are re-assigned to group A at block 272. Obtained slots are assigned to the group at block 274. The available slot data is renewed at block 276 and the process ends at block 278.

It should be appreciated that utilizing the above algorithm the minimum number of slots do not have to be reserved for group B, C and D when no streams are being sent at that priority.

FIG. 9 illustrates an example of bandwidth management programming being executed according to the present invention, which extends from the flowchart in FIG. 8A at block 238.

The blocks labeled "Reassign of Gp. X" and "Minimize of Gp. X" are performed by executing the slot reassignment algorithm described previously, wherein X is selected within the set of groups {A, B, C, D}. After a request for transmitting a new stream is received, unused slots are recovered from minimum slot assignments for use by a stream, and if more slots are required then slot priorities are taken into account in a slot allocation process which commences at block 290. It is determined at block 292 if sufficient time slots are available to fulfill all the bandwidth requests. If sufficient bandwidth exists then block 294 is executed assigning the requested number of time slots to the new stream, and the available slot information is renewed as represented by block 296, after which the algorithm exits as per block 298.

If it is determined at block 292 that insufficient time slots exist to accommodate all requests, then the nature of the new stream request is checked as per block 300. If the new stream is associated with an asynchronous communication (group C or D), then a check is made for a group C stream as represented by block 302. If it is not a group C stream, and is thereby a group D stream, then the available group D time slots are reassigned as per block 304 to equitably share them with this new stream. For a group C stream a check is performed at block 306 to determine if sufficient time slots can be taken from group D streams. If enough time slots exist then they are assigned as per block 308 and the group D time slots are reassigned as per block 304. If insufficient group D time slots exist, then group D time slots are minimized as per block 310 and the freed-up time slots are used along with reassigning group C time slots to give an equitable share of the time slots to the new stream.

If the new stream is not associated with an asynchronous communication (i.e. a group A or B request) then execution continues at block 314, wherein it is determined if time slots are available which may be taken from group D allocations. If sufficient time slots do exist, then a sufficient number of the group D time slots are reassigned from the group D time slots, as depicted by block 316, and assigned to the new stream as per block 294. If sufficient Group D time slots are not available, then the group D assignments are minimized at block 318, leaving any additional time slots freed-up for reassignment.

If sufficient time slots are not available from group D streams, a check is performed at block 320 determining if time slots are available from the group C time slots, that when combined with any freed-up group D time slots can fulfill the request from the new stream. If sufficient slots are available above the minimum time slots for group C as detected at block 320, along with those taken from group D at block 318, then these slots are reassigned as per block 322 and assigned to the new stream as per block 294. Otherwise, group C assignments are minimized as per block 324 freeing up additional time slots for reassignment.

A determination is performed as to whether the request is a group A request as per block 326, wherein if it is not a group A request, then execution continues at block 328 for the group B request wherein time slots are reassigned to group B from those freed-up from both group C and D streams. If insufficient slots are freed-up to fulfill group B time slot requests, then slot reduction will occur, because time slots may not be taken from the higher priority group A streams.

If the request was for a group A stream, as determined at block 326, then execution continues at block 330, wherein it is determined if sufficient time slots exist above the minimum within group B. If sufficient additional time slots may be freed-up from group B to fulfill the request, then they are assigned to slots in group A at block 332 and if sufficient blocks exist then reassignment of time slots freed-up within groups B, C, and D occurs at block 328. If insufficient time slots exist as determined at block 330, then the time slots for group B are minimized at block 334, and the time slots collected from groups B, and D are utilized in combination with slot reduction to reassign time slot within group A as per block 336.

3.2 Examples of Time Slot Management for a New Stream.

The following examples are provided by way of example to aid in understanding allocation of time slots for a new stream. Presume for this discussion that the minimum allocated slots for each group is given by: B: 80, C: 10; D: 5, as shown in Table 1. It should be noted that time slot minimums are not specified for priority group A because this group has the highest priority. Assuming further that the total available bandwidth under a given condition is 250 slots.

3.2.1 Case 1.

Group A is initially utilizing all of the 250 slots. A transmitter wants to start a new group D stream that requires 5 slots. The minimum slot allocation for group D is 5 slots and group D thereby obtains 5 time slots from group A. Group A is given 245 slots and reduction is performed to fit 245 slots. The time slot requests and allocations both before and after the process are listed in Table 2. The reduction ratio is 245/250. The execution path is described within the flowchart of FIG. 8A and FIG. 8B traversing blocks: 230, 232, 234, 236, 240, 250, 252, 260, 262, 270, 272, 274, 276, and 278.

3.2.2 Case 2.

Group A, C and D are using 230, 15 and 5 slots respectively. A transmitter will start a group B stream that requires 40 slots. The minimum slot numbers for group B is 80 and group D uses the minimum number of slots. Group C uses more than the minimum of 10 slots, but group B cannot obtain enough slots from group C. Therefore, group B obtains 40 slots from a combination of both group A and group B. The time slot requests and allocations both before and after the process are listed in Table 3. The execution path is described within the flowchart of FIG. 8A and FIG. 8B traversing blocks: 230, 232, 234, 236, 240, 242, 250, 252, 254, 258, 260, 270, 272, 274, 276, and 278.

3.2.3 Case 3.

This is a case in which a new group B stream (or streams) requires 100 slots under the same condition as case 2. Group B is assigned 80 slots taken from group A and group C. The time slot requests and allocations both before and after the process are listed in Table 4. The execution path is the same as in case 2 above, however, slot reduction is performed at block 274. The resultant slot reduction ratio is 80/100.

3.2.4 Case 4.

Assume in the following examples that each group is currently assigned time slots as follows: A: 120; B: 100; C: 15; D: 10. It should be noted that 245 time slots in total are utilized with an extra 5 time slots available for use.

A transmitter wanting to send a new group D stream sends a request for 10 time slots to the master. In response to this event the 5 remaining slots are assigned for this stream, no other time slots are assigned. The total requested time slots for group D is now 10+10=20, although only 15 time slots are available. Therefore, the group D streams are configured to equally utilize the available 15 time slots. The path is described within the flowchart of FIG. 8A and 9 traversing blocks: 230, 232, 234, 236, 238, 290, 292, 300, 302, 304, 296, 298. The time slot assignments before and after the reassignment described above are shown in Table 5. As a consequence of the new stream being a group D stream, the number of time slots assigned to group A, B, and C does not change.

3.2.5 Case 5.

A transmitter is required to send a new group C stream and requests 20 time slots from the master. In response to this event the 5 remaining slots are thereby assigned from group C, yet 15 more time slots are required to fulfill the request. Group D currently utilizes 10 time slots, and utilization is reduced to its minimum level of 5 time slots, thus freeing up 5 additional time slots. Time slots can not be reduced from groups B and A as these are at a higher priority. Therefore, only 10 additional time slots are assigned to group C, and the new total of 25 time slots allocated for group C are shared between the existing stream(s) and the new stream, utilizing slot reduction. The path is described within the flowchart of FIGS. 8A and 9 traversing blocks: 230, 232, 234, 236, 238, 290, 292, 300, 302, 306, 310, 312,

296, 298. The time slot assignments before and after the reassignment described above are shown in Table 6. Note that the number of time slots utilized for groups A, and B did not change.

3.2.6 Case 6.

A transmitter is required to communicate a new group B stream and requests 20 more time slots from the master. In response to this event the remaining 5 time slots are first assigned to group B for the stream, then group D time slots are reduced to a minimum, and since more time slots are still needed, group C time slots are also reduced to the minimum, with five time slots being taken from each. In the aggregate 15 time slots are thus added for group B. As no more time slots are available, since group A time slots are at a higher priority and should not be taken, the 115 time slots allocated to group B are then shared between the original streams and the new stream. The path is described within the flowchart of FIGS. 8A and 9 traversing blocks: 230, 232, 234, 236, 238, 290, 292, 300, 314, 318, 320, 324, 326, 328, 296, 298. The time slot assignments before and after the reassignment described above are as shown in Table 7. Note that no change occurred in group A time slot assignments.

3.2.7 Case 7.

A transmitter is required to communicate a new group A stream and requests 33 time slots from the master. In response to this event, the 5 remaining time slots are first assigned to the new stream, the time slots utilized by group D are minimized, and since enough new time slots are still not available, the number of time slots for group C are also minimized. The aggregate extra time slots made available is now at 15, with 18 additional time slots needed. These 18 time slots are taken from group B, dropping group B time slots from 100 down to 82. The group B streams must then share the streams 82 allocated to them, which is a rate reduction from the original one hundred aggregate time slots requested. This slot reduction is preferably facilitated by rate-adjustment within the streams as previously described. A total of 33 time slots have thus been freed-up wherein group A can transmit the new stream without rate reductions. The execution path is described within the flowchart of FIGS. 8A and 9 traversing blocks: 230, 232, 234, 236, 238, 290, 292, 300, 314, 318, 320, 324, 326, 330, 332, 328, 296, 298. The time slot assignments before and after the reassignment described above are shown in Table 8.

3.3 Time Slot Management After Stream Termination.

The previous section explained aggregating time slots for assignment in association with a new stream, whereas this section describes time slot management after a stream terminates. When a stream terminates, the time slots utilized by that stream will be released, and the newly available slots may be reassigned to the other on-going streams based on group priorities. The released time slots being made available to groups in the prioritized order of group A, group B, group C, and lastly group D.

Figure 10A:
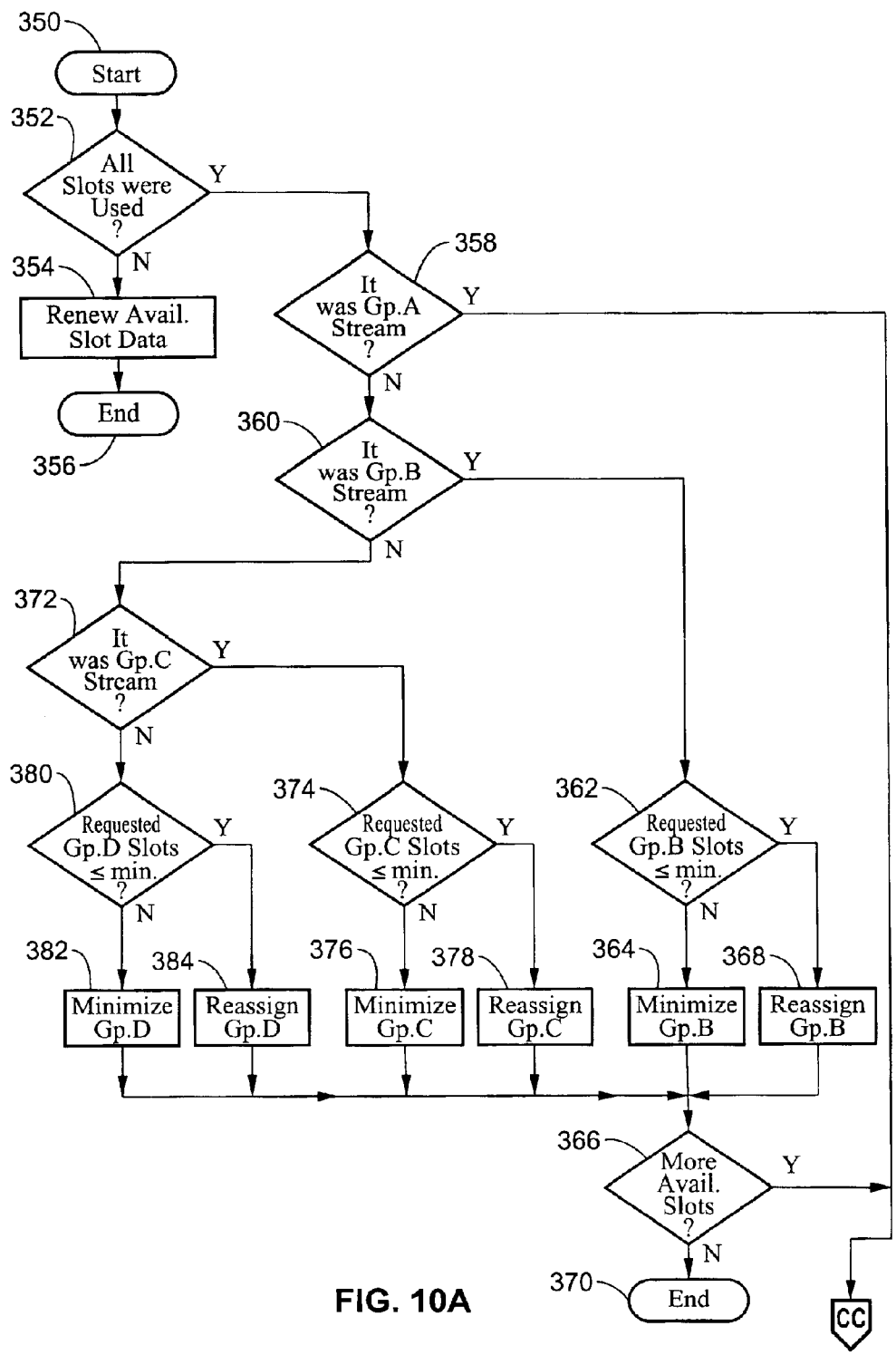
FIG. 10A is a flowchart depicting reassignment of time slots after stream terminations according to an aspect of the present invention.
Figure 10B:
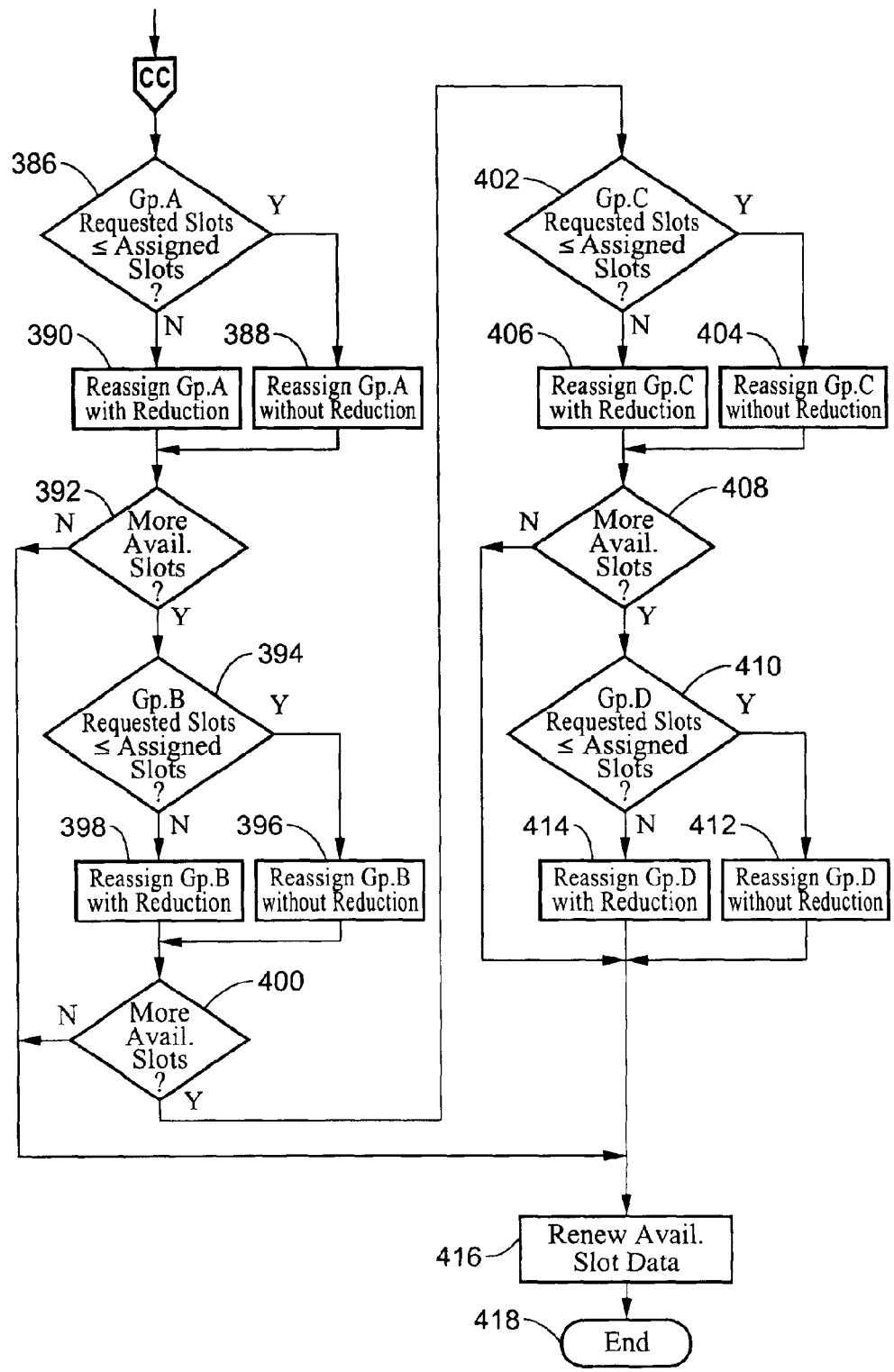
FIG. 10B is a flowchart which is a continuation of FIG. 10A.

FIG. 10A and FIG. 10B illustrate an example of the algorithm for reassigning time slots when the associated streams are released. When time slots are released, the time slot allocation for that group needs to be updated to reflect the released time slots. The newly available time slots may then be utilized for other streams and they are made available to groups in the order of group priority, A, B, C, D.

Reassignment processing commences at block 350, and a check for time slot utilization before termination is performed at block 352. If all time slots were not utilized prior to termination of the stream, the execution proceeds to block 354 wherein the information on available time slots is renewed prior to exiting the procedure at block 356. It will be appreciated that if the time slots were not needed before a stream terminated, they will still not be needed in response to termination of the stream. The result is an increase in the number of available time slots for future assignment.

If however, all time slots were previously in use, as detected by block 352, then the freed-up time slots are preferably reallocated if any group has need. The time slots within the group terminating the stream must take into account the freed-up time slots, so minimization or reallocation within that group occurs first. At block 358 it is determined if the terminated stream was a group A stream. If it was a group A stream, then processing continues (through connector A—A) into FIG. 10B. It will be appreciated that group A streams are never minimized, being the highest priority, wherein time slots released by a group A stream may be immediately reassigned based on priority to a group.

If the released time slots were not associated to a group A stream, then it is determined at block 360 if they were released from a group B stream. Processing for a group B terminated stream continues at block 362, wherein the total time slots originally requested by all group B streams, except the terminated stream, are compared with the group B minimum slots. If the number of requested time slots still exceeds the minimum number of time slots, processing continues at block 364, wherein the number of time slots is kept at the minimum, and processing continues to determine a proper allocation for the newly freed-up time slots as represented by block 366. Even if the requested number of time slots for group B cannot be completely fulfilled, the resultant slot reduction ratio for group B will be less than it was before.

If, however, the number of time slots requested (a number that now reflects the time slots released) is not greater than the minimum number of time slots allotted for group B, then time slots are reassigned from those released as per block 368 and processing continues to determine a proper allocation for the newly freed-up time slots as represented by block 366. If available slots exists, they are allocated as processing continues, through connector CC to FIG. 10B.

If the terminated stream was either a group C or D stream, processing passes through blocks 358, 360 to block 372 wherein it is determined if the terminated stream was a group C stream. If the terminated stream was a group C stream, then processing continues at block 374, wherein the number of time slots utilized either remains at the minimum as per block 376, or some of the released slots are reassigned to fulfill the original time slot request as per block 378. In either case, if additional time slots are still available, as determined at block 366, then processing continues.

If the terminated stream was not a group C stream, as detected by block 372, then it must be a group D terminated stream, then processing continues at block 380, wherein the number of time slots is kept at a minimum as per block 384 if the requested number of time slots does not exceed the minimum number of time slots allocated for the group, otherwise the minimum time slots are assigned to group D, as shown by block 382, in an attempt to fulfill the original request. Again, any remaining additional time slots are detected and processed as per FIG. 10B.

Time slots which are still available are then assigned to groups, whose original time slot requests are not being met, as based on group priority. The reallocation of these time slots first checks time slot needs of group A streams and proceeds down through the groups based on priority until the released time slots are all reallocated or all slots have reached their desired level of time slot allocations, wherein additional time slots may be unused and thereby available for future group needs.

It is determined at block 386 if the group A streams were able to obtain the time slots they are requesting. If the requested number of time slots is equal to, or smaller than, the current number of time slots, execution branches to block 388, wherein the time slots reassignment algorithm is called and the slots are reassigned. No slot reduction is executed because there are enough slots for group A. If more time slots were requested than have been allocated, then the available time slots are utilized in an attempt to fulfill the original request as depicted in block 390, however, time slot reduction may still arise if sufficient time slots are not available. Although time slot-reduction may still be necessary after assigning additional time slots, it should be realized that the slot-reduction ratio improves as it moves closer to a one-to-one ratio between assigned time slots and requested time slots.

A check at block 392 is performed to determine if additional time slots exist. If the available time slots have been assigned, then no further checking is necessary; otherwise allocation of the available time slots continues. A check at block 394 determines if group B has requested more time slots than it is currently allocated. If group B has the number of time slots it requested then time slots may be reassigned as per block 396 without the need of a time slot reduction. If however, requested time slots exceed allocated time slots, then the available time slots may be reassigned, as per block 398, to meet the need. Lacking sufficient time slots to completely fulfill the requests of group B, a time slot reduction occurs to best utilize the available time slots.

A check for available time slots is performed at block 400, wherein remaining time slots may then be allocated to group C and/or to group D. A similar process of checking for time slot needs occurs at blocks 402, 410, and reassignment of time slots for fulfilled requests 404, 412, or reassignment with additional time slots with possible time slot reduction performed as per blocks 406, 414 for group C and group D.

After the above reallocation of available time slots the information about available time slots is updated as shown by block 416 and the process terminates 418.

3.4 Examples of Time Slot Management After Stream Termination.

Operation of the system, with regard to releasing time slots after a stream terminates, may be more clearly understood by way of example. Consider the same case as described previously in which the bandwidth comprises 250 time slots and the minimum number of slots allocated for each group given by: B: 80; C: 10; and D: 5, as listed in Table 1.

In the above scenario the bus is very busy and all the slots are fully utilized. Groups B, C and D have been reduced to the minimum assignable number of time slots, while time slot reduction occurs with group A slots reduced from 165 to 155. The slot number request and assignment conditions are listed in the before portion of Table 9.

3.4.1 Case 1.

Under the above conditions, consider that a group A stream has just terminated which originally requested 5 slots, wherein the transmitter responds to the event by asking the master to cancel 5 time slot requests bringing the total number of time slots requested by group A to 160 time slots for this example (165−5=160). It will be noted that the number of time slots requested still exceeds the 155 time slots currently assigned. Wherein after reassigning the time slots from the terminated stream, a slot reduction is executed. No additional time slots were available for use by group B, C and D streams. The execution path is described within the flowchart of FIG. 10A and FIG. 10B traversing blocks: 350, 352, 358, 386, 390, 392, 416, and 418. Time slot assignments before and after executing the new above reassignments are shown in Table 9.

In the above scenario it should be noted that the number of requested time slots dropped by 5, however, the utilization remained the same because the time slots released by a group A stream were utilized by other group A streams. The reduction ratio for group A changed from 155/165 to 155/160 allowing streams within group A to achieve higher data rates in response to termination of one stream that utilized 5 time slots.

3.4.2 Case 2.

In this scenario consider a group A stream being terminated which had requested 40 time slot requests. In response to this event the transmitter requests the master to cancel the 40 time slots, wherein the total number of time slots requested for group A drops down to 125 time slots, (165−40=125). Because the total number of time slots requested is less than the current number 155 of time slots assigned, 30 time slots become available to other lower priority streams, (155−125=30 time slots). Of these time slots 20 are assigned to group B which is requesting 100 time slots, while the remaining 10 time slots are utilized for group C bringing the total number of time slots assigned to group C up to 20. No additional time slots are made available for group D streams. The execution path is described within the flowchart of FIG. 10A and FIG. 10B traversing blocks: 350, 352, 358, 386, 388, 392, 394, 396, 400, 402, 404, 408, 416, and 418. Time slot assignments before and after executing the above reassignments are shown in Table 10.

It will be appreciated from viewing Table 10 that all available time slots are still being utilized, however, now group A, group B, and group C streams are being transmitted at the requested rate, while time slot reduction remains for group D streams.

3.4.3 Case 3.

Consider this case in which the transmitter terminates a group B stream that had originally requested 42 time slots. In response to this event the transmitter asks the master to cancel 42 of the time slot requests, wherein the requested number of time slots for group B drops from 100 down to 58, (100−42=58). Currently group B is assigned 80 time slots, and the system frees a total of 22 time slots, (80−58=22). The first 10 time slots are assigned to the highest priority streams in group A to meet the request for 165 time slots. A total of 10 more time slots are assigned for streams within group C bringing it to 20 assigned time slots, while the remaining 2 time slots are assigned to group D, which still is subject to slot reduction, having requested 10 time slots and now receiving 7 of those 10 time slots, instead of the previous 5 of the 10 time slots requested. The execution path is described within the flowchart of FIG. 10A and FIG. 10B traversing blocks: 350, 352, 358, 360, 362, 368, 366, 386, 388, 392, 394, 396, 400, 402, 404, 408, 410, 414, 416, and 418. Time slot assignments before and after executing the above reassignments are shown in Table 11.

It will be appreciated from viewing Table 11 that all available time slots are still being utilized, however, now group A, group B, and group C streams are being transmitted at the requested rate, while less time slot reduction is being executed for streams in group D.

3.4.4 Case 4.

Consider this scenario wherein the transmitter terminates a group B stream that had requested 10 time slots. In response to this event the transmitter requests the master to cancel 10 of the requested time slots, wherein the number of time slots requested by group B drops from 100 time slots down to 90 time slots, (100−10=90 time slots). The 90 time slots requested still exceed the 80 time slot minimum allocated for group B, wherein the 10 extra time slots are utilized for group A streams, thus fulfilling their full request for 165 time slots. The minimum of 80 time slots are again assigned for group B, and no additional time slots are available for speeding up group B streams or the streams at a lower priority. The execution path is described within the flowchart of FIG. 10A and FIG. 10B traversing blocks: 350, 352, 358, 360, 362, 364, 366, 386, 388, 392, 416 and 418. Time slot assignments before and after executing the above reassignments are listed in Table 12.

It will be appreciated that all available time slots are still being utilized, however, now group A streams are being transmitted at the requested rate. The group B reduction ratio changed from 80/100 to 80/90, allowing video streams in group B to achieve higher rates even though additional time slots were not assigned.

3.5 Optional and Alternative Aspects.

The flowcharts described above illustrate in a convenient form the general flow of a preferred embodiment of the present invention. However, the handling of stream priority within the present invention may be implemented in a number of alternative ways using alternative program flows without departing from the present invention. Aspects of the invention have been generally described in relation to this preferred embodiment, however, the invention may be implemented with a number of variations and alternatives without departing from the teachings of the present invention.

By way of example, an arbitrary number of priority groups may be supported by the present invention, these need not be limited to practicing the described four priority groups. It will be appreciated that the degenerative case of a single priority group is operational for sharing bandwidth across the virtual networks without regard to stream priority.

The transmission requirements for a stream are generally described herein relating to an original request for a number of time slots however, it will be appreciated that the number of time slots requested for a stream may dynamically change in response to conditions (i.e. noise), external conditions of the application, or historical time slot allocations. For instance, a stream may only require X time slots to maintain a desired communication, however, after being held to an allocation of X−Y time slots for a period T, it may have dropped below a desired "synchronization level" or other metric of the application and thereby request an allocation of X+Z time slots to recoup losses as warranted by the application.

4. Adaptive Bandwidth Control.

As the conditions on the power line change dynamically from moment to moment, the present system is preferably configured to adaptively control the amount of bandwidth assigned to the streams. For example, when noise conditions get worse, a stream might require more time slots than currently assigned, wherein the transmitter requests additional time slots from the master. The master preferably handles the requests as a new stream request and applies the same slot management algorithm and slot reassignment algorithm described above. If time slots are available, then the transmitter utilizes the original slots along with the newly assigned time slots for carrying the same stream.

When noise conditions improve, the transmitter may request that the master cancel its additionally requested time slots. The master preferably handles the request as a stream termination of the newly assigned stream and applies the same slot management algorithm and slot reassignment algorithm.

5. Variations.

The prioritization of time slot use by streams is described herein according to fixed group priorities, however, the present invention may be configured with mechanisms for adjusting group priorities and even individual stream-based priorities in response to need or history. For example, the priority of a stream toward gaining additional time slots may increase in response to the difference between requested time slots and allocated time slots over a period of time or history. In this way stream bandwidth deprivation may be controlled in response to the needs of any specific application. By way of further example, streams could be promoted between groups based on external condition changes, historical time slot assignment, or other determiners, without departing from the teachings of the present invention.

The present system preferably employs a form of time division multiple access (TDMA), in which a bandwidth unit is represented as a number of time slots. It should be appreciated, however, that the present invention is not limited to utilizing TDMA, as a number of bandwidth allocation mechanisms may be alternatively utilized without departing from the present invention. By way of example and not limitation, a form of frequency division multi access (FDMA) may be alternately employed in which frequency slots are assigned to a stream instead of time slots. A hybrid bandwidth allocation may also be created utilizing a combination of TDMA and FDMA within an embodiment of the present invention.

It will be appreciated that the present invention has been described in association with a preferred implementation on a power-line network, however it should be appreciated that the invention can be applied to other technologies including those which are wired, wireless, and which may utilize other network technologies.

It will also be appreciated that the present invention has been described according to a preferred embodiment having one or more optional features. It should be appreciated that the invention may be implemented with or without these features or variations thereof without departing from the teachings of the present invention. Aspects of the invention may be practiced in combination, or in some cases separate from the overall bandwidth management system, without departing from the teachings of the invention.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more."

All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

Minimum Time Slot Allocations for Examples (Tables 2–8)

| Group | Minimum Number of Slots |
|---|---|
| A | N/A- |
| B | 80 |
| C | 10 |
| D | 5 |
| Total | 95 |

TABLE 2

Event: New group D stream(s) gaining slots from Group A

| | Number of Slots | | | |
|---|---|---|---|---|
| | Before | | After | |
| Group | requested | assigned | requested | assigned |
| A | 250 | 250 | 250 | 245 |
| B | 0 | 0 | 0 | 0 |
| C | 0 | 0 | 0 | 0 |
| D | 0 | 0 | 5 | 5 |
| Total | 250 | 250 | 255 | 250 |

TABLE 3

Event: New group B stream obtaining slots

| | Number of Slots | | | |
|---|---|---|---|---|
| | Before | | After | |
| Group | requested | assigned | requested | assigned |
| A | 230 | 230 | 230 | 195 |
| B | 0 | 0 | 40 | 40 |
| C | 15 | 15 | 15 | 10 |
| D | 5 | 5 | 5 | 5 |
| Total | 250 | 250 | 290 | 250 |

TABLE 4

Event: New group B stream attempts to obtain more than minimum slots

| | Number of Slots | | | |
|---|---|---|---|---|
| | Before | | After | |
| Group | requested | assigned | requested | assigned |
| A | 230 | 230 | 230 | 155 |
| B | 0 | 0 | 100 | 80 |
| C | 15 | 15 | 15 | 10 |
| D | 5 | 5 | 5 | 5 |
| Total | 250 | 250 | 290 | 250 |

TABLE 5

Event: New group D stream requests 10 time slots

| | Number of Slots | | | |
|---|---|---|---|---|
| | Before | | After | |
| Group | requested | assigned | requested | assigned |
| A | 120 | 120 | 120 | 120 |
| B | 100 | 100 | 100 | 100 |
| C | 15 | 15 | 15 | 15 |
| D | 10 | 10 | 20 | 15 |
| Total | 245 | 245 | 255 | 250 |

TABLE 6

Event: New group C stream requests 20 more time slots

| | Number of Slots | | | |
|---|---|---|---|---|
| | Before | | After | |
| Group | requested | assigned | requested | assigned |
| A | 120 | 120 | 120 | 120 |
| B | 100 | 100 | 100 | 100 |
| C | 15 | 15 | 35 | 25 |
| D | 10 | 10 | 10 | 5 |
| Total | 245 | 245 | 260 | 250 |

TABLE 7

Event: New group B stream requests 20 more time slots

| | Number of Slots | | | |
|---|---|---|---|---|
| | Before | | After | |
| Group | requested | assigned | requested | assigned |
| A | 120 | 120 | 120 | 120 |
| B | 100 | 100 | 120 | 115 |
| C | 15 | 15 | 15 | 10 |
| D | 10 | 10 | 10 | 5 |
| Total | 245 | 245 | 265 | 250 |

TABLE 8

Event: New group A stream requests 33 more time slots

| | Number of Slots | | | |
|---|---|---|---|---|
| | Before | | After | |
| Group | requested | assigned | requested | assigned |
| A | 120 | 120 | 153 | 153 |
| B | 100 | 100 | 100 | 82 |
| C | 15 | 15 | 15 | 10 |
| D | 10 | 10 | 10 | 5 |
| Total | 245 | 245 | 278 | 250 |

TABLE 9

Event: group A terminates 5 time slots

Number of Slots

| | Before | | After | |
| --- | --- | --- | --- | --- |
| Group | requested | assigned | requested | assigned |
| A | 165 | 155 | 160 | 155 |
| B | 100 | 80 | 100 | 80 |
| C | 20 | 10 | 20 | 10 |
| D | 10 | 5 | 10 | 5 |
| Total | 295 | 250 | 290 | 250 |

TABLE 10

Event: group A terminates 40 time slots

Number of Slots

| | Before | | After | |
| --- | --- | --- | --- | --- |
| Group | requested | assigned | requested | assigned |
| A | 165 | 155 | 125 | 125 |
| B | 100 | 80 | 100 | 100 |
| C | 20 | 10 | 20 | 20 |
| D | 10 | 5 | 10 | 5 |
| Total | 295 | 250 | 255 | 250 |

TABLE 11

Event: group B terminates 42 time slots

Number of Slots

| | Before | | After | |
| --- | --- | --- | --- | --- |
| Group | requested | assigned | requested | assigned |
| A | 165 | 155 | 165 | 165 |
| B | 100 | 80 | 58 | 58 |
| C | 20 | 10 | 20 | 20 |
| D | 10 | 5 | 10 | 7 |
| Total | 295 | 250 | 253 | 250 |

TABLE 12

Event: group B terminates 10 time slots

Number of Slots

| | Before | | After | |
| --- | --- | --- | --- | --- |
| Group | requested | assigned | requested | assigned |
| A | 165 | 155 | 165 | 165 |
| B | 100 | 80 | 90 | 80 |
| C | 20 | 10 | 20 | 10 |
| D | 10 | 5 | 10 | 5 |
| Total | 295 | 250 | 285 | 250 |

What is claimed is:

1. An apparatus for managing bandwidth allocated to a plurality of virtual networks on the same shared network, comprising:

a server device configured for connection to a virtual network on a shared network and configured to communicate with at least one other said server device; and means associated with said server device for dynamically allocating bandwidth to each virtual network on said shared network to which said server devices are connected, and for reallocating said bandwidth if sufficient bandwidth on said shared network is not available to simultaneously support bandwidth requirements of said virtual networks;

wherein at any given time a said one of said server devices functions as an active master server;

wherein said active master server functions to reallocate said bandwidth if sufficient bandwidth on said shared network is not available to simultaneously support bandwidth requirements of said virtual networks;

wherein said server device is configured to detect the presence of an active master server when newly connected to a virtual network on said shared network and, if no active master server is detected, to become said active master server; and wherein, upon disconnection of said active master server, another said server device becomes said active master server.

2. An apparatus as recited in claim 1, wherein said shared network comprises a physical power-line communication network.

3. An apparatus as recited in claim 1, wherein said means for dynamically allocating bandwidth is configured to allocate the available bandwidth across a set of priority groups into which data streams are categorized on the basis of data stream content.

4. An apparatus as recited in claim 3, further comprising means for establishing a minimum amount of bandwidth to be allocated to each priority group.

5. An apparatus as recited in claim 3, wherein data streams having an isochronous nature are categorized into a high priority group, while data streams having an asynchronous nature are categorized into a lower priority group.

6. An apparatus as recited in claim 5, wherein said means for dynamically allocating bandwidth is configured to categorize isochronous streams into group A or B, and asynchronous streams into group C or D.

7. An apparatus as recited in claim 6, wherein VoIP (voice over internet protocol) and audio or video streams for live-recordings are categorized in group A, playback of audio/video streams is categorized in group B, web accesses are categorized in group C, and file transfers are categorized in group D.

8. An apparatus as recited in claim 3, wherein said means for dynamically allocating bandwidth is configured to fulfill all bandwidth requests of any virtual network requesting up to its equal share of bandwidth within a given priority group, and to equally share remaining bandwidth amongst virtual networks requesting more bandwidth within a given priority group.

9. An apparatus as recited in claim 1, wherein said means for dynamically allocating bandwidth is integrated within a device selected from the group of audio end video devices consisting essentially of set-top boxes, computer servers, television sets, audio and/or video recording devices, and audio and/or video playback devices.

10. An apparatus as recited in claim 1, wherein said means for dynamically allocating bandwidth comprises:
   a computer processor within said server device; and
   programming executable by said computer processor for carrying out the operations of
      dividing the available bandwidth of the shared network into assignable units,
      ordering streams, being transmitted over the shared network, into priority groups,
      assigning units of bandwidth to said priority groups in response to the bandwidth requirements of said streams and the transmission priority of said priority group, and
      assigning specific units of bandwidth to specific streams within each of said priority groups in response to an equitable sharing of bandwidth between said virtual networks sharing said shared network.

11. An apparatus for managing bandwidth allocated to virtual networks sharing the bandwidth of a shared network, comprising:
   a computer processor within a server device configured for communicating over said shared network with other said server devices; and
   programming executable on said computer processor for carrying out the operations of
      dividing the available bandwidth of the shared network into assignable units,
      categorizing streams for transmission over said shared network into priority groups,
      assigning sections of bandwidth to said priority groups in response to the bandwidth requirements of said streams and the transmission priority of said priority group, and
      assigning units of bandwidth to specific streams within each of said priority groups;
   wherein at any given time a said one of said devices functions as an active master server;
   wherein said active master server functions to reallocate said bandwidth if sufficient bandwidth on said shared network is not available to simultaneously support bandwidth requirements of said virtual networks;
   wherein said server device is configured to detect the presence of an active master server when newly connected to a corresponding virtual network on said shared network and, if no active master server is detected, to become said active master server; and
   wherein, upon disconnection of said active master server, another said server device becomes said active master server.

12. An apparatus as recited in claim 11, wherein said bandwidth within a given priority group is assigned on an as-needed basis to virtual networks utilizing up to their equal share of bandwidth within said given priority group, with additional available bandwidth being equally divided between virtual networks with unfulfilled bandwidth requests.

13. An apparatus as recited in claim 11, wherein said bandwidth is divided into assignable time slots.

14. An apparatus as recited in claim 13, wherein one or more specific time slots can be assigned when dividing bandwidth.

15. An apparatus as recited in claim 14, wherein said programming dynamically reassigns time slots in response to changes in available bandwidth, the number of streams being transmitted, and the priorities of the transmitted streams.

16. An apparatus as recited in claim 14, wherein said dynamic reassignment is performed by an algorithm which is independently applied to each of said priority groups.

17. An apparatus as recited in claim 16:
   wherein said algorithm is passed parameters comprising the requested number of time slots per stream, the priority group for each stream, and the targeted total number of slots allocated for each group;
   wherein said algorithm returns the reassigned slot number for each stream, and the total number of slots allocated as equal to or less than the targeted number.

18. An apparatus as recited in claim 16, wherein said algorithm comprises:

$$U(i) = \sum_{j=0}^{Strm(k)} s(i, j)$$

$\delta(x,y)$: Kronecker's delta function
   $\delta(x,y)=1$ if $x=y$;
   $\delta(x,y)=0$ if $x \neq y$;
$\min(x,y)$: minimum function
   $\min(x,y)=x$ if $x \leq y$;
   $\min(x,y)=y$ if $x>y$;

$$T = \sum_{i=0}^{k-1} r(i)U(i);$$

wherein k is the total network number; i is the network index ($0 \leq i<k$); j is the stream index ($0 \leq j<\text{strm}(i)$); T is the targeted total slot number; p is the stream number of r(i)=1; strm(i) is the total stream number on network i; r(i) is the reduction ratio of network i ($0 \leq r(i)<1$), wherein if r(i) is 1, no reduction performed; s(i,j) is the slot number originally requested by stream j on network i; and U(i) is the slot number originally requested by network i.

19. An apparatus as recited in claim 14, wherein said computer is configured for communicating audio and/or video streams as received from stream input devices and as transmitted to stream output devices, said input and output devices being those connected to said virtual network.

20. An apparatus as recited in claim 14, further comprising encrypting data transmitted over said virtual networks.

21. An apparatus as recited in claim 11, further comprising data storage within said server device configured for recording and playing back audio and video streams.

22. An apparatus as recited in claim 21, wherein said server device is configured as an audio and/or video server.

23. An apparatus as recited in claim 11, further comprising an output means integrated with said server device and configured for playing audio and/or video streams.

24. An apparatus as recited in claim 11, further comprising an audio and/or video tuner integrated with said server device and configured for receiving audio and/or video streams from an antenna or cable connection.

25. An apparatus as recited in claim 11, further comprising a codec integrated with said server device for encoding and decoding audio and/or video streams.

26. An apparatus as recited in claim 11, further comprising at least one user interlace on said server device configured for controlling communications of audio and video streams over said virtual network.

27. An apparatus as recited in claim 11, wherein said shared network comprises a portion of a power line distribution system.

28. An apparatus as recited in claim 27, wherein each of said virtual networks is associated with an individual dwelling, structure, or entity.

29. An apparatus as recited in claim 11, further comprising a remote communication link on said server device configured for communicating with remote systems which can not accessed over said shared network.

30. A system for managing bandwidth allocated to a plurality of virtual networks on the same shared network, comprising:
- a first server device connected to a virtual network on a shared network;
- a second server device connected to another virtual network on said shared network;
- said first and second server devices configured for communication with each other; and
- means associated with each said server device for dynamically allocating bandwidth to each virtual network on said shared network to which said server devices are connected, and for reallocating said bandwidth if sufficient bandwidth on said shared network is not available to simultaneously support bandwidth requirements of said virtual networks;
- wherein at any given time a said one of said server devices functions as an active master server;
- wherein said active master server functions to reallocate said bandwidth if sufficient bandwidth on said shared network is not available to simultaneously support bandwidth requirements of said virtual networks;
- wherein said server devices are configured to detect the presence of an active master server when newly connected to a corresponding virtual network on said shared network and, if no active master server is found, to become said active master server; and
- wherein, upon disconnection of said active master server, another said server device becomes said active master server.

31. A system as recited in claim 30, wherein said shared network comprises a power-line communication network.

32. A system as recited in claim 30, wherein said means for dynamically allocating bandwidth is configured to allocate the available bandwidth across a set of priority groups into which data streams are categorized on the basis of data stream content.

33. A system as recited in claim 32, further comprising means for establishing a minimum amount of bandwidth to be allocated to each priority group.

34. A system as recited in claim 32, wherein data streams having an isochronous nature are categorized into a high priority group, while data streams having an asynchronous nature are categorized into a lower priority group.

35. A system as recited in claim 34, wherein said means for dynamically allocating bandwidth is configured to categorize isochronous streams into group A or B, and asynchronous streams into group C or D.

36. A system as recited in claim 35, wherein VoIP (voice over internet protocol) and audio or video streams for live-recordings are categorized in group A, playback of audio/video streams is categorized in group B, web accesses are categorized in group C, and file transfers are categorized in group D.

37. A system as recited in claim 32, wherein said means for dynamically allocating bandwidth is configured to fulfill all bandwidth requests of any virtual network requesting up to its equal share of bandwidth within a given priority group, and to equally share remaining bandwidth among virtual networks requesting more bandwidth within a given priority group.

38. A system as recited in claim 30, wherein said means for dynamically allocating bandwidth is integrated within a device selected from the group of audio and video devices consisting essentially of set-top boxes, computer servers, television sets, audio and/or video recording devices, and audio and/or video playback devices.

39. A system as recited in claim 30, wherein said means for dynamically allocating bandwidth comprises:
- a computer processor within a said device; and
- programming executable by said computer processor for carrying out the operations of
  - dividing the available bandwidth of the shared network into assignable units,
  - ordering streams, being transmitted over the shared network, into priority groups,
  - assigning units of bandwidth to said priority groups in response to the bandwidth requirements of said streams end the transmission priority of said priority group, and
  - assigning specific units of bandwidth to specific streams within each of said priority groups in response to an equitable sharing of bandwidth between said virtual networks shoring said shared network.

* * * * *